(12) United States Patent
Chun

(10) Patent No.: US 10,156,074 B2
(45) Date of Patent: Dec. 18, 2018

(54) SNOW-MELTING ROOF TILE AND ROOF SNOW-MELTING SYSTEM INCLUDING SAME

(71) Applicant: JOONG ANG STEEL CO., INC., Iksan-si, Jeollabuk-do (KR)

(72) Inventor: Ji-Hyun Chun, Iksan-si (KR)

(73) Assignee: JOONG ANG STEEL CO., LTD., Iksan-si, Jeollabuk-do (KR)

( * ) Notice: Subject to any disclaimer, the term of this patent is extended or adjusted under 35 U.S.C. 154(b) by 62 days.

(21) Appl. No.: 15/506,487

(22) PCT Filed: Aug. 18, 2015

(86) PCT No.: PCT/KR2015/008609
§ 371 (c)(1),
(2) Date: Feb. 24, 2017

(87) PCT Pub. No.: WO2016/032161
PCT Pub. Date: Mar. 3, 2016

(65) Prior Publication Data
US 2018/0223534 A1    Aug. 9, 2018

(30) Foreign Application Priority Data

Aug. 29, 2014 (KR) .......................... 10-2014-0114447

(51) Int. Cl.
*E04D 1/30* (2006.01)
*E04H 9/16* (2006.01)
(Continued)

(52) U.S. Cl.
CPC .................. *E04D 1/30* (2013.01); *B32B 3/04* (2013.01); *B32B 15/00* (2013.01); *E04D 1/28* (2013.01);
(Continued)

(58) Field of Classification Search
CPC ............ E04D 1/30; E04D 1/28; E04D 13/103
See application file for complete search history.

(56) References Cited

U.S. PATENT DOCUMENTS

| 5,813,184 A | * | 9/1998 | McKenna | ................ H05B 3/00 |
|---|---|---|---|---|
| | | | | 52/518 |
| 5,961,869 A | * | 10/1999 | Irgens | ...................... H05B 3/36 |
| | | | | 219/213 |
| 6,124,571 A | * | 9/2000 | Miller | ................... E04D 13/103 |
| | | | | 219/213 |
| 6,166,352 A | * | 12/2000 | Turton | ................... E04D 13/103 |
| | | | | 219/213 |

(Continued)

FOREIGN PATENT DOCUMENTS

| JP | 08-270155 A | 10/1996 |
|---|---|---|
| JP | 10-046751 A | 2/1998 |
| JP | 2006-322663 A | 11/2006 |
| JP | 2009-228316 A | 10/2009 |

*Primary Examiner* — Paola Agudelo
(74) *Attorney, Agent, or Firm* — Rabin & Berdo, P.C.

(57) ABSTRACT

A snow-melting roof tile according to an embodiment of the present invention comprises: a metal roof tile including a main cover part, a first bending part bent vertically and located at a first edge in a first direction of the main cover part and, and a second bending part bent vertically and located at a second edge in the first direction, opposite to the first edge of the main cover part; a heat generation part located an upper portion or lower portion of the metal roof tile; and a fixing part for fixing the heat generation part to the metal roof tile, wherein the heat generation part can generate heat to heat the metal roof tile, thereby melting snow on the metal roof tile.

9 Claims, 21 Drawing Sheets

(51) Int. Cl.
*E04D 13/00* (2006.01)
*B32B 3/04* (2006.01)
*B32B 15/00* (2006.01)
*E04D 1/28* (2006.01)
*E04D 13/10* (2006.01)
*H05B 3/26* (2006.01)
*E04D 1/34* (2006.01)
*E04D 1/00* (2006.01)

(52) U.S. Cl.
CPC ............ *E04D 13/00* (2013.01); *E04D 13/103* (2013.01); *E04H 9/16* (2013.01); *H05B 3/26* (2013.01); *B32B 2255/06* (2013.01); *B32B 2255/20* (2013.01); *B32B 2419/06* (2013.01); *E04D 1/34* (2013.01); *E04D 2001/005* (2013.01); *E04D 2001/308* (2013.01); *E04D 2001/3458* (2013.01)

(56) References Cited

U.S. PATENT DOCUMENTS

| | | | |
|---|---|---|---|
| 6,875,954 B2* | 4/2005 | DeBenedetto | E04D 13/103 219/212 |
| 9,097,019 B1* | 8/2015 | Rasmussen | E04D 1/34 |
| 9,297,541 B1* | 3/2016 | McGillycuddy | F24D 13/00 |
| 2004/0244324 A1 | 12/2004 | McKenna | |
| 2006/0289110 A1* | 12/2006 | Schmitt | H05B 3/36 156/250 |
| 2014/0259988 A1* | 9/2014 | Kobayashi | E04D 1/30 52/126.1 |
| 2014/0263266 A1* | 9/2014 | Jenkins | E04D 13/103 219/213 |
| 2015/0354217 A1* | 12/2015 | Lucas | E04D 1/30 52/588.1 |

\* cited by examiner

SNOW-MELTING ROOF TILE AND ROOF SNOW-MELTING SYSTEM INCLUDING SAME

TECHNICAL FIELD

The present invention relates to a snow-melting roof tile, in which a heat generation part is attached to a metal roof tile to melt snow accumulated on a roof and a roof snow-melting system including the same.

BACKGROUND ART

In an area where it snows heavily, several accidents occur due to snow accumulated on a roof. The roof that does not withstand the weight of the snow may collapse, and workers may fall off the roof during removal of the snow accumulated on the roof. In addition, pedestrians may be hit by the snow falling from the roof, resulting in death and injury.

According to the related art, a method for installing a heating cable on the roof is used so as to solve the foregoing problems. However, since the cable itself is buried under the snow due to a small diameter of the heating cable, a snow-removing effect may be not fully obtained.

Also, since the heating cables are disorderly disposed, there is a disadvantage that an appearance of a building is not good.

DISCLOSURE OF THE INVENTION

Technical Problem

To solve the foregoing problems, an object of the present invention is to provide a snow-melting roof tile, which is capable of removing snow accumulated on the roof by effectively melting the snow through heating of the roof over a wide area.

Also, another object of the present invention is to provide a snow-melting roof tile, which is not spoiled the beauty of the roof because a heat generation part is not exposed to the outside.

Technical Solution

A snow-melting roof tile according to an embodiment of the present invention, a metal roof tile including a main cover part, a first end portion and a second end portion, which are disposed at both ends in a first direction of the main cover part, a first bending part bent upwardly from the first end portion, and a second bending part bent downward from the second end portion; a heat generation part located on a lower portion of the metal roof tile; and a fixing part for fixing the heat generation part to the metal roof tile, wherein the heat generation part generates heat to heat the metal roof tile, thereby the heat of the heat generation part is transferred to the upper portion of the metal roof tile so as to melt snow on the metal roof tile.

A roof snow-melting system according to an embodiment of the present invention, comprises a first snow-melting roof tile, which is formed by molding a metal into a roof tile shape and a lower portion of which a heat generation part is attached to; and a second snow-melting roof tile, which is formed by molding a metal into a roof tile shape, a lower portion of which a heat generation part is attached to, and a portion of which is disposed to overlap the first snow-melting roof tile, wherein the heat generation part of the first snow-melting roof tile is electrically connected in series to the heat generation part of the second snow-melting roof tile in a longitudinal direction or an width direction of the snow-melting roof tiles, and the heat generation part of each of the first snow-melting roof tile and the second snow-melting roof tile generates heat to heat the snow-melting roof tile, thereby melting snow on the snow-melting roof ties.

A roof snow-melting system according to an embodiment of the present invention, comprises a first snow-melting roof tile, which is formed by molding a metal into a roof tile shape and a lower portion of which a heat generation part is attached to; a second snow-melting roof tile, which is formed by molding a metal into a roof tile shape, a lower portion of which a heat generation part is attached to, and a portion of which is disposed to overlap the first snow-melting roof tile; and an external cable connected to the heat generation part of the first snow-melting roof tile and the heat generation part of the second snow-melting roof tile, wherein the external cable extends in a longitudinal direction or an width direction.

A snow-meting roof tile according to an embodiment of the present invention, comprises a metal roof tile including a first end portion and a second end portion, which are disposed at both ends in a first direction, a third end portion and a fourth end portion, which are disposed at both ends in a second direction, a first bending part adjacent to the first end portion, a second bending adjacent to the second end portion, a main cover part disposed between the first bending part and the second bending part, and an accommodation part is formed to be recessed upwardly or downwardly from the main cover part; and a heat generation part, which is accommodated in the accommodation part and generates heat.

Advantageous Effects

According to the present invention, the effective snow-melting may be enabled by heating the roof over a wide area.

Also, since the heat generation part is not well exposed to the outside, the appearance of the building may not be spoiled.

MODE FOR CARRYING OUT THE INVENTION

Hereinafter, a snow-melting roof tile according to an embodiment of the present invention will be described with reference to the accompanying drawings.

Figure 1:
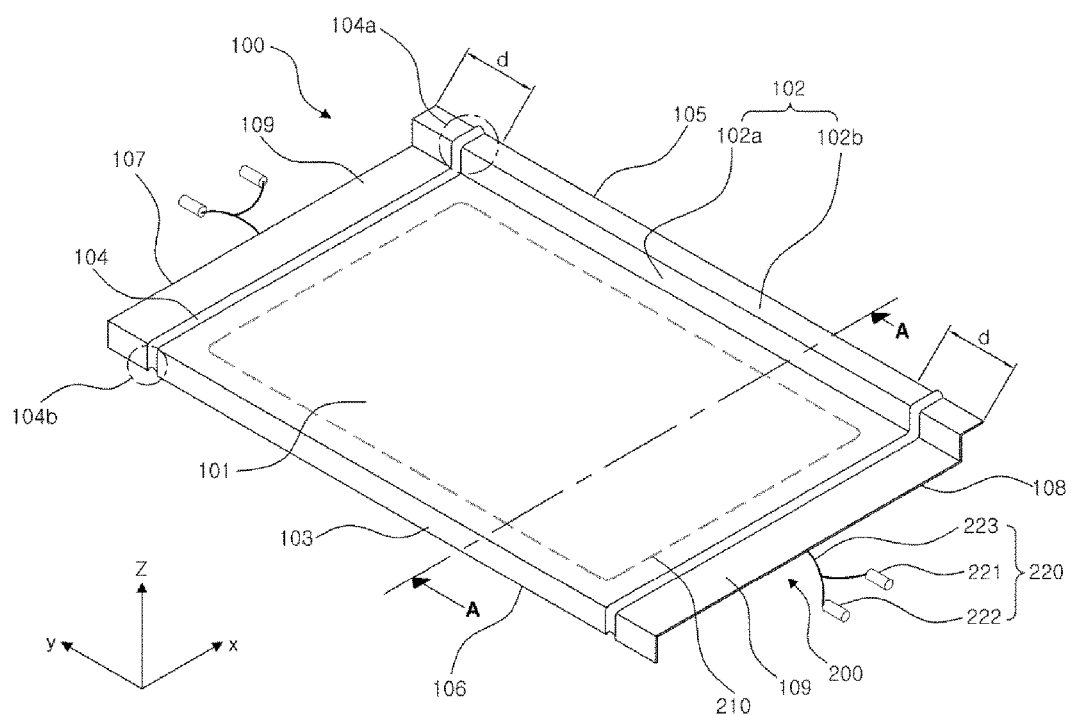
FIG. 1 is a perspective view illustrating a snow-melting roof tile according to an embodiment of the present invention.
Figure 2:
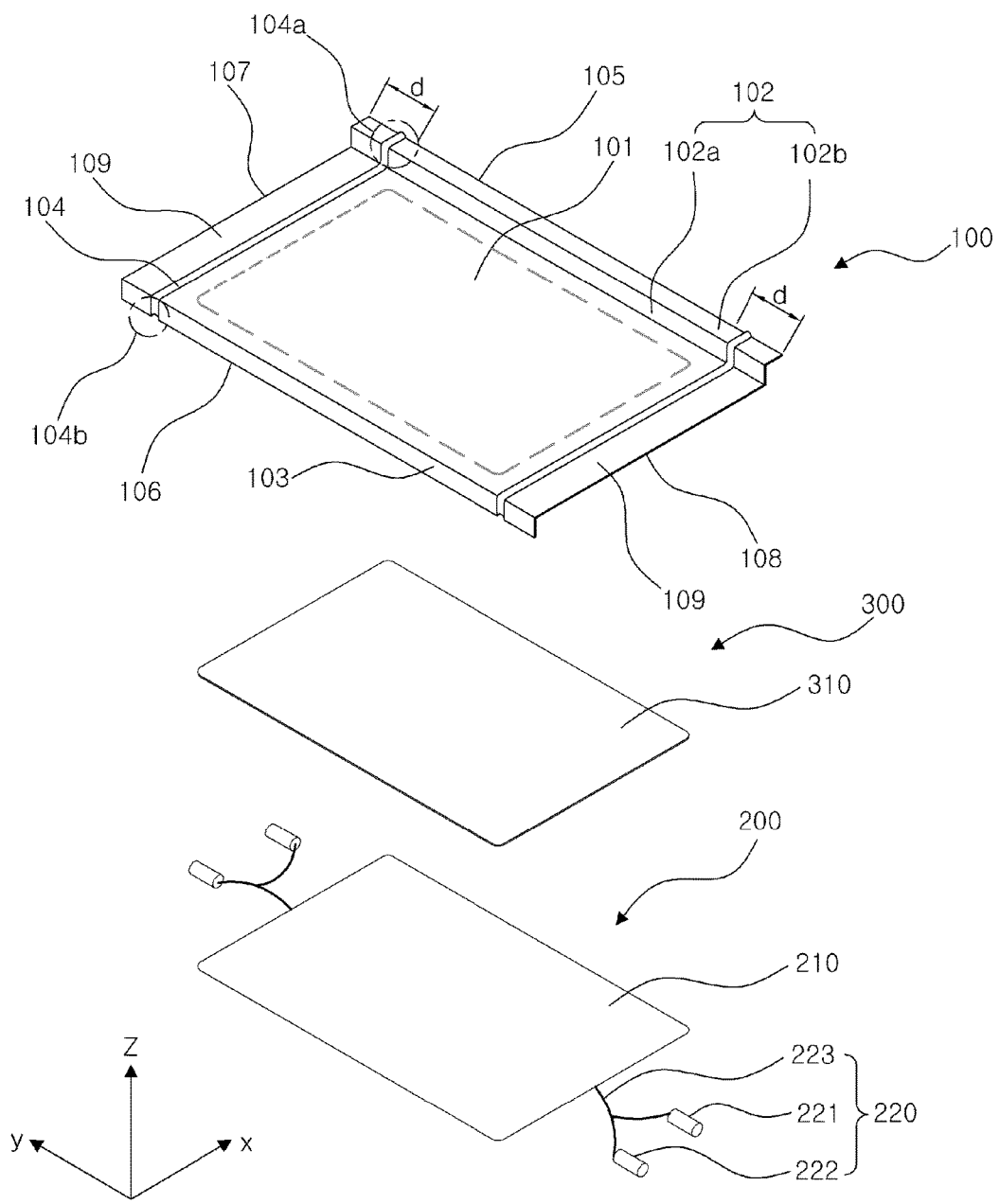
FIG. 2 is an exploded perspective view illustrating a snow-melting roof tile according to an embodiment of the present invention.
Figure 3:
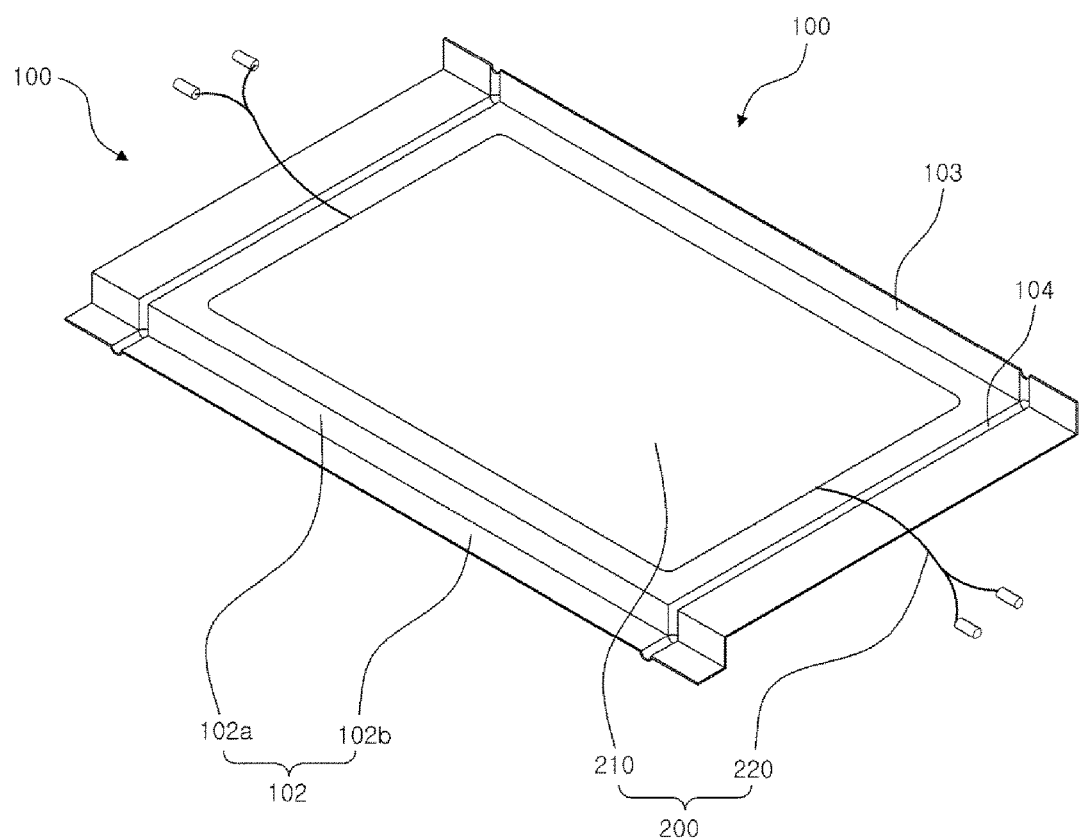
FIG. 3 is a perspective view of the snow-melting roof tile when obliquely viewed from the lower side according to an embodiment of the present invention.
Figure 4:
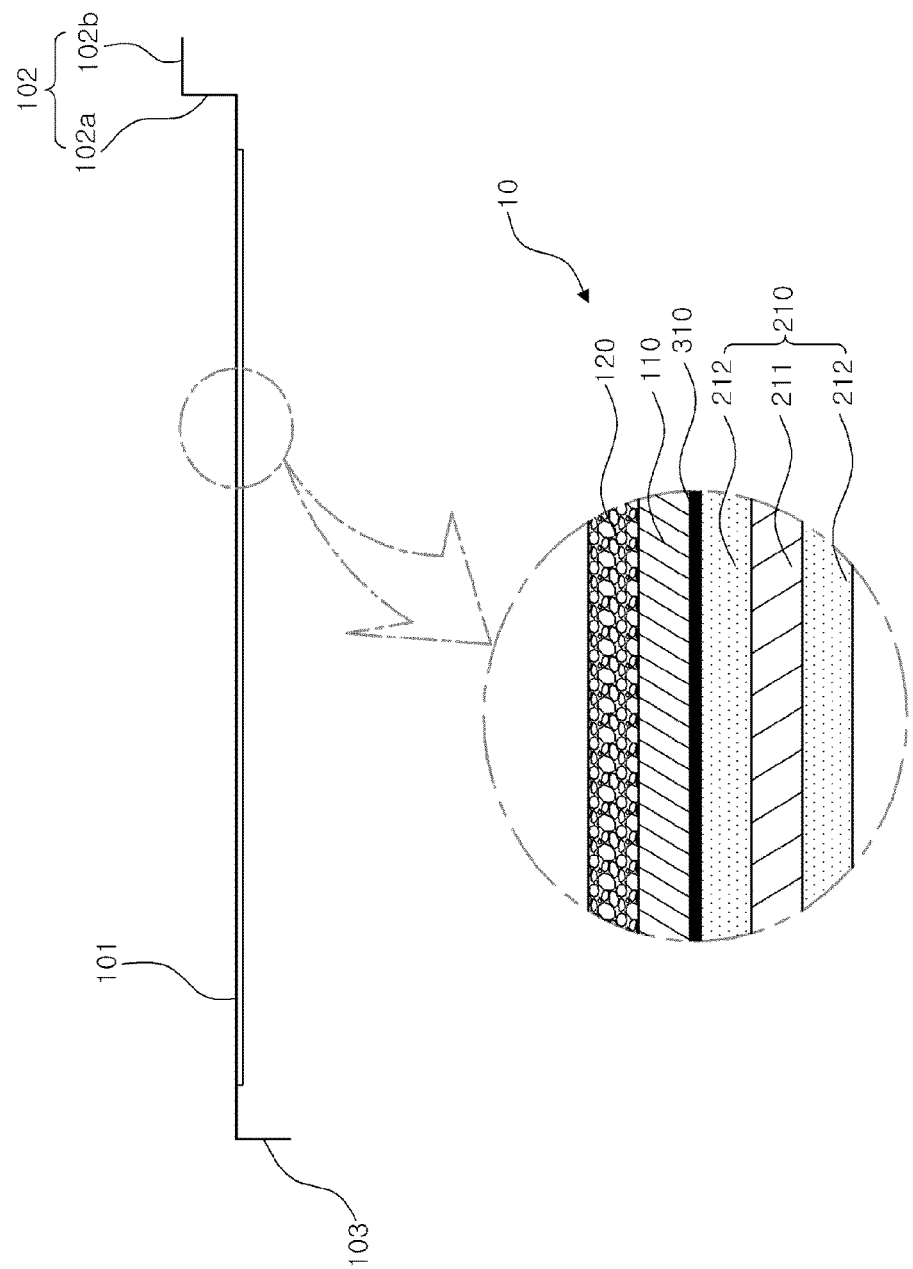
FIG. 4 is a cross-sectional view taken along line A-A of FIG. 1.

FIG. 1 is a perspective view illustrating a snow-melting roof tile according to an embodiment of the present invention, FIG. 2 is an exploded perspective view, FIG. 3 is a perspective view of the snow-melting roof tile when obliquely viewed from the lower side according to an embodiment of the present invention, and FIG. 4 is a cross-sectional view taken along line A-A of FIG. 1.

Referring to FIGS. 1 to 4, a snow-melting roof tile according to an embodiment of the present invention includes a metal roof tile 100 made of a metal, a heat generation part 200 attached to one side of the metal roof tile 100, and a fixing part 300 configured to fix the metal roof tile 100 to the heat generation part 200. Thus, heat of the heat generation part 200 is transferred to an upper portion of the metal roof tile 100 to melt snow accumulated on the upper portion of the metal roof tile 100.

Hereinafter, a constitution of each of the metal roof tile 100, the heat generation part 200, and the fixing part 300 will be described in more detail.

The metal roof tile 100 extends lengthily in a first direction (X-axis direction) and a second direction (Y-axis direction). The first direction and the second direction cross each other. For example, the first and second directions may be perpendicular to each other. Here, the first direction may be a slope direction of a roof, and the second direction may be a direction crossing the slope direction. Also, the first direction may be a width direction of the metal roof tile or the snow-melting roof tile, and the second direction may be a longitudinal direction. Here, the longitudinal direction means a direction (Y-axis direction) in which the metal roof tile 100 extends relatively lengthily, and the width direction (X-axis direction) means a direction, perpendicular to the longitudinal direction, in which the metal roof tile 100 extends relatively shortly.

The metal roof tile 100 includes a first end portion 105 disposed at an end in the first direction (X-axis direction), a second end portion 106 disposed opposite to the first end portion in the first direction, a third end portion 107 disposed at an end portion of one side in the second direction (Y-axis direction) crossing the first direction (X-axis direction), a fourth end portion 108 disposed opposite to the third end portion in the second direction, a first bending portion 102 adjacent to the first end portion 105, a second bending portion 103 disposed adjacent to the second end portion 106, and a main cover part 101 disposed between the first bending part and the second bending part.

Explaining the above description again, the metal roof tile 100 includes the main cover part 101 having a relatively wide area, the first bending part 102 bent to protrude upwardly from one side of the main cover part 101, and the second bending part 103 bent to protrude downward from the other side of the main cover part 101. Thus, the first bending part 102 is disposed opposite to the second bending part 103 in the first direction (X-axis direction, width direction) with respect to the main cover part 101. Also, each of the first bending part 102 and the second bending part 103 extends lengthily in the second direction (Y-axis direction, longitudinal direction). Explaining the above description in more detail, when an end of one side lengthily extending in the second direction (Y-axis direction, longitudinal direction) of the metal roof tile 100 is denoted as the first end portion 104, and when an end opposite thereto is denoted as the second end portion 105, the first bending part 102 is disposed adjacent to the first end portion 104, and the second bending part 103 is disposed adjacent to the second end portion 105. Thus, the first bending part 102 is disposed at an upper side of the inclined surface of the roof, and the second bending part 103 is disposed at a lower side of the inclined surface of the roof. Also, the first end portion 104 and the second end portion 105 are respectively disposed at both ends in the first direction (X-axis direction).

The first bending part 102 may include a vertical extension part 102a extending upwardly from the main cover part 101 and a horizontal extension part 102b extending horizontally from the vertical extension part 102a. Here, the horizontal extension part 102b may extend to nearly cross the vertical extension part 102a or extend obliquely at a predetermined angle with respect to the vertical extension part 102a. Each of the vertical extension part 102a and the horizontal extension part 102b extends lengthily in the second direction (longitudinal direction, Y-axis direction). Alternatively, each of the vertical extension part 102a and the horizontal extension part 102b may be provided in plurality.

Also, the metal roof tile 100 includes an overlapping part 109 disposed at each of both ends in the second direction (longitudinal direction, Y-axis direction). The overlapping part 109 extends from a longitudinal directional end, i.e., each of the third end portion 107 and the fourth end portion 108 to an end opposite thereto at a predetermined distance.

The overlapping part 109 is a region in which one metal roof tile 100 overlaps another metal roof tile 100 adjacent thereto in the second direction (longitudinal direction).

Figure 13:
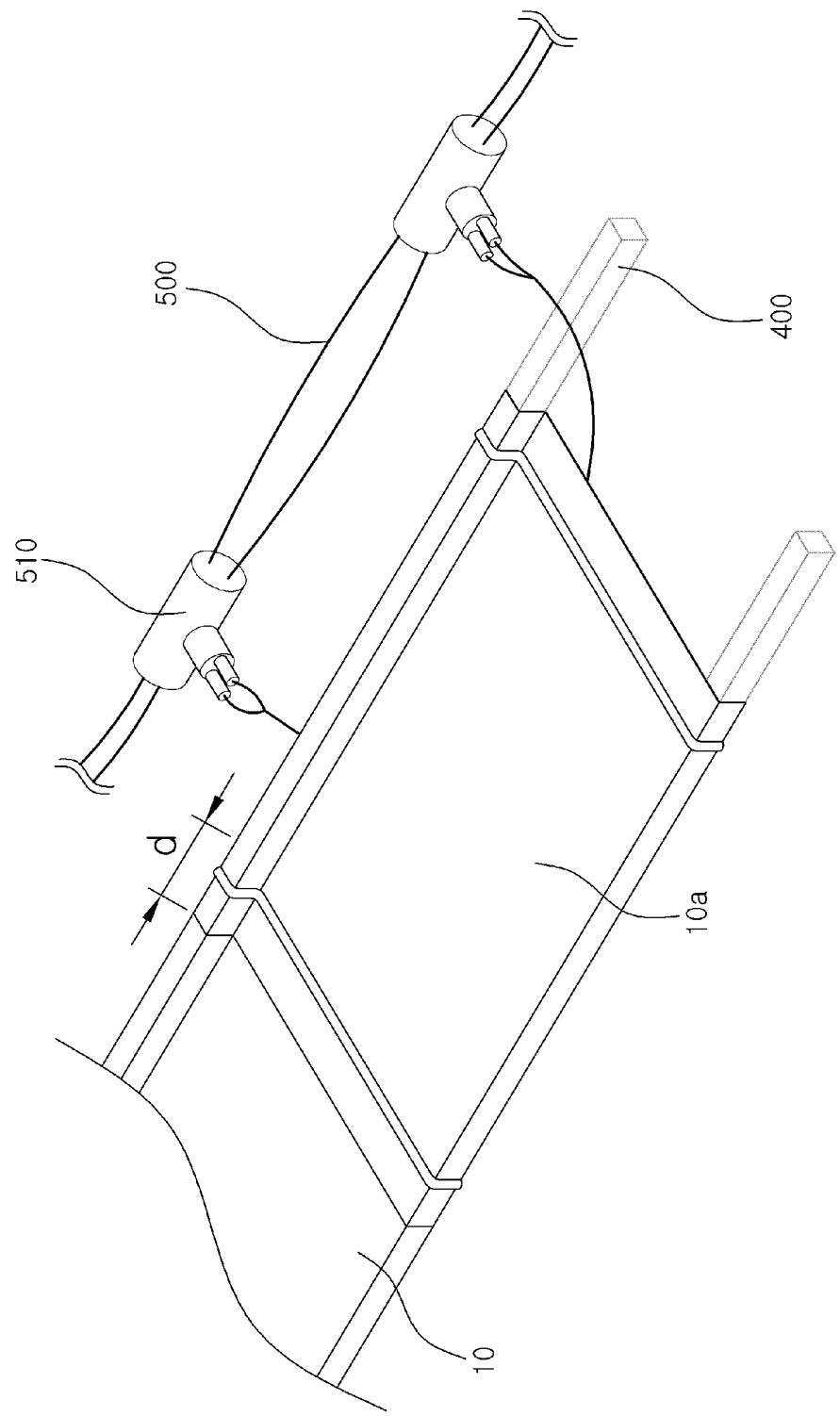
FIG. 13 is a view illustrating a configuration in which the snow-melting roof tiles are connected in parallel in the longitudinal direction according to an embodiment of the present invention.
Figure 14:
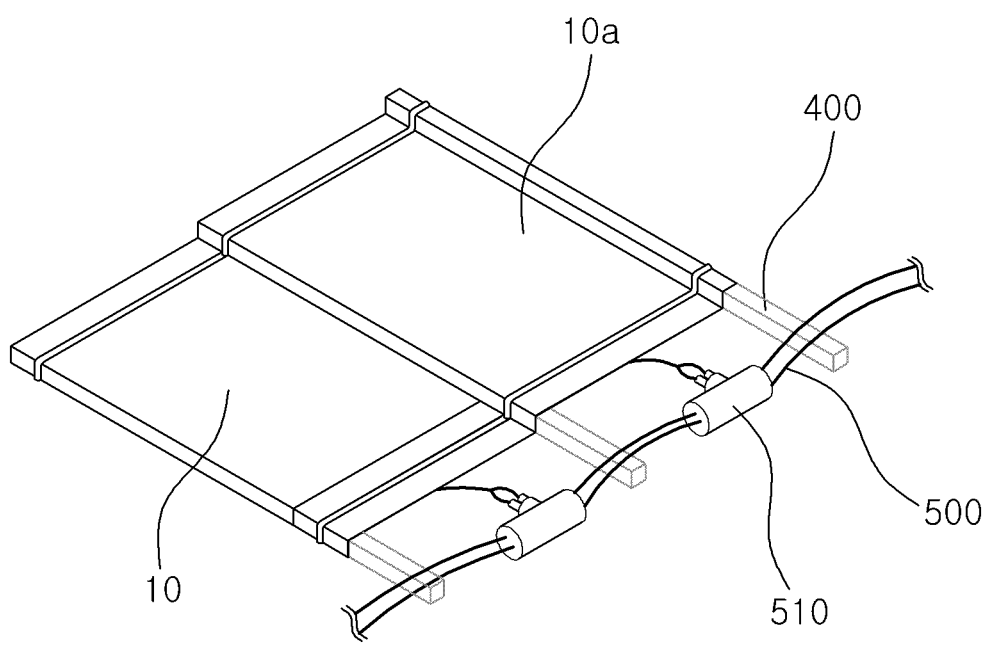
FIG. 14 is a view illustrating a configuration in which the snow-melting roof tiles are connected in parallel in the width direction according to an embodiment of the present invention.
Figure 15:
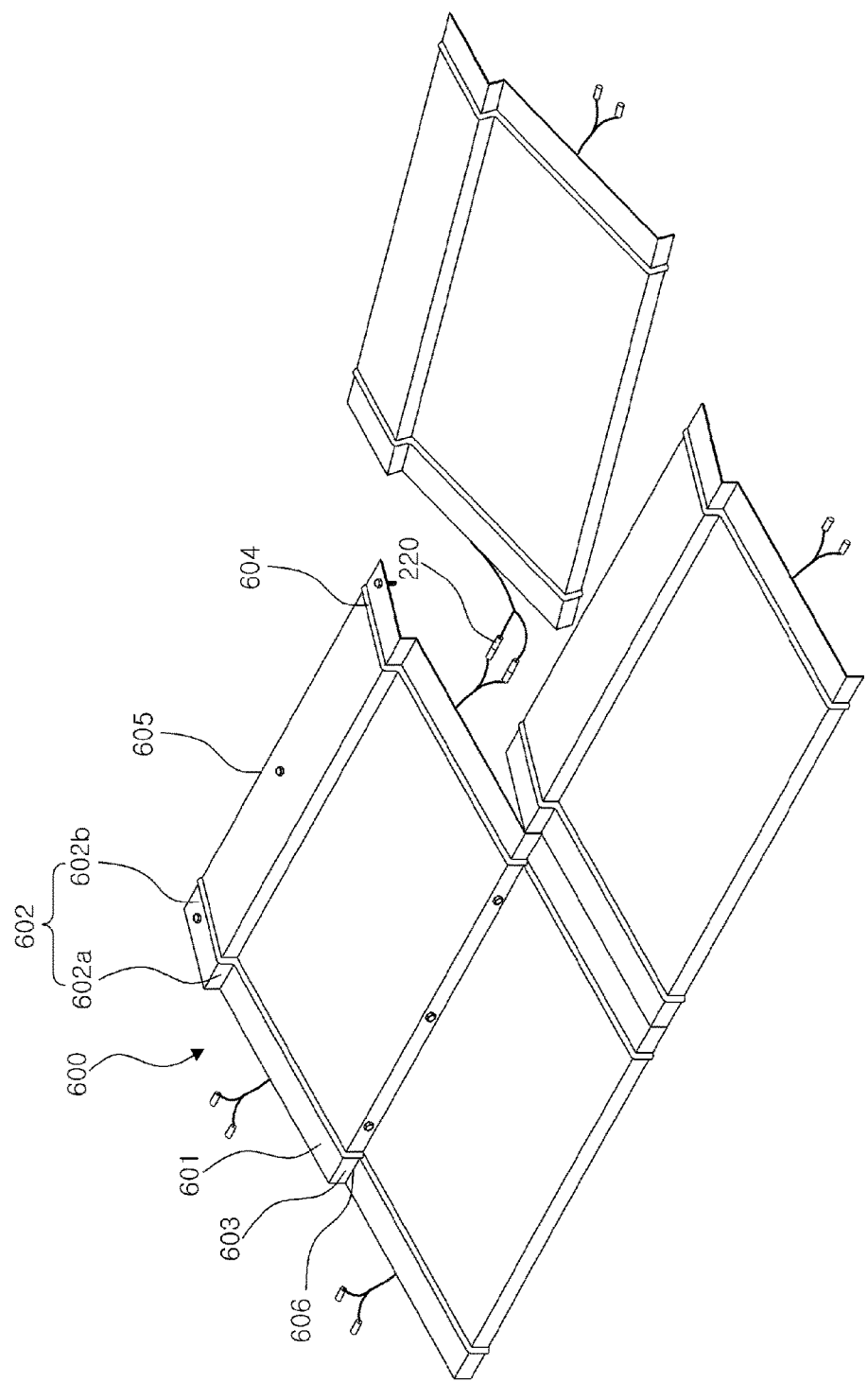
FIG. 15 is a view illustrating a configuration in which batten-less type snow-melting roof tiles are connected in series in a longitudinal direction according to an embodiment of the present invention.

Also, the metal roof tile 100 may further include a cable passing part 104. The cable passing part 104 is a part through which an internal cable 223 of a connecting part 220 described later passes when the snow-melting roof tile is constructed. For reference, the snow-melting roof tile may be fixed on a batten 400 as illustrated in FIGS. 9A to 11 or may be fixed on a roof surface without the batten 400 as illustrated in FIGS. 13 to 15.

Figure 10A:
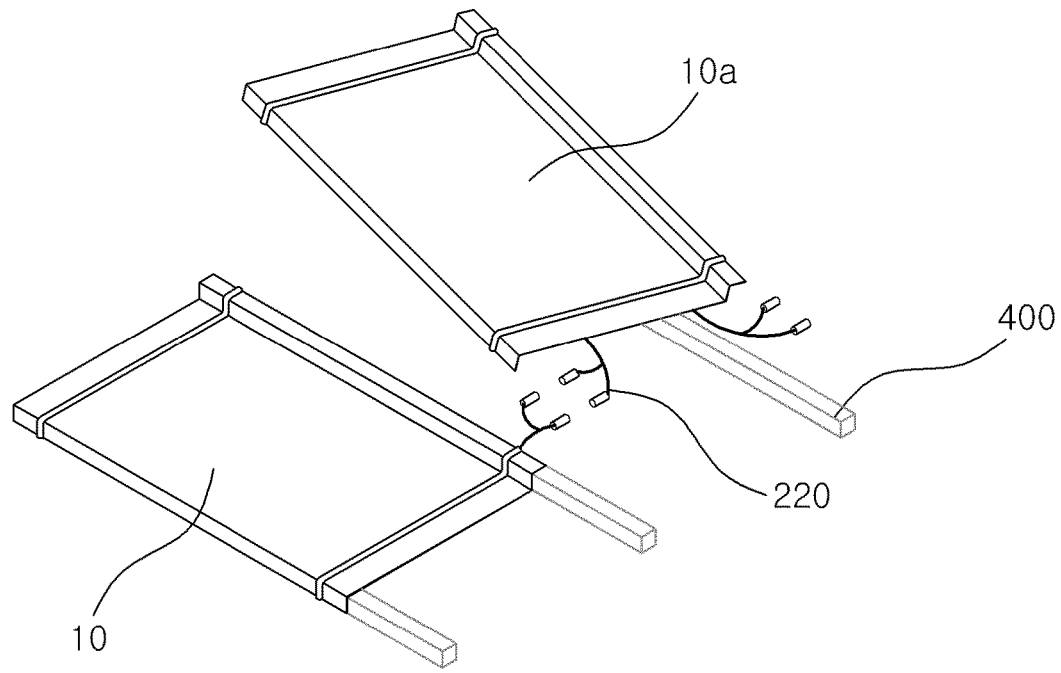
FIGS. 10A and 10B are views illustrating a configuration in which the snow-melting roof tiles are installed in series in a width direction according to an embodiment of the present invention.
Figure 10B:
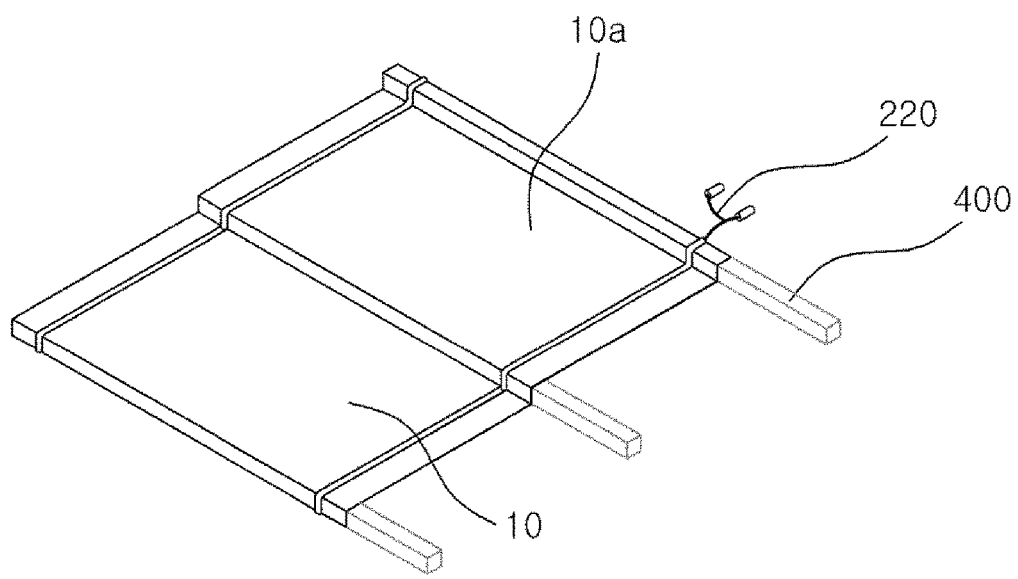
Figure 11:
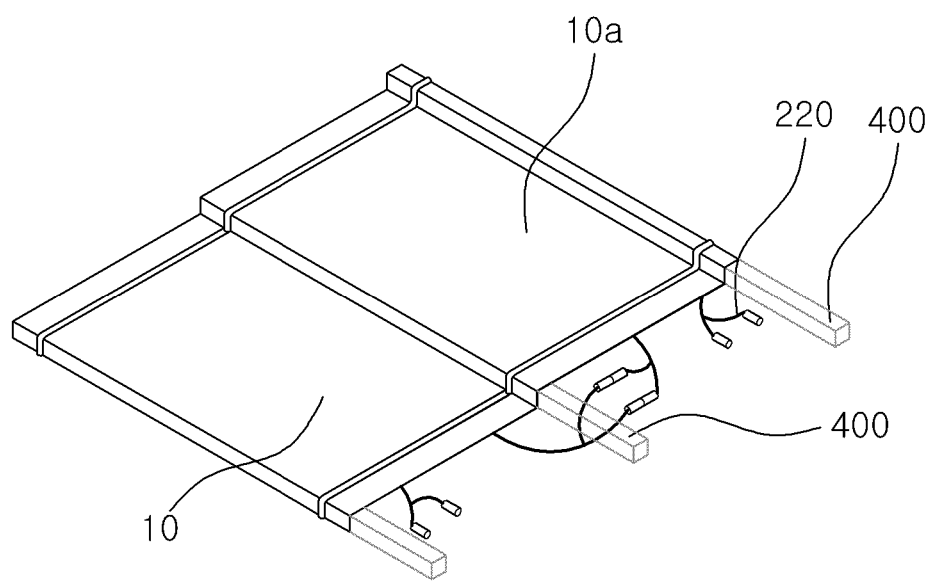
FIG. 11 is a view illustrating another configuration in which the snow-melting roof tiles are connected in series in the width direction according to an embodiment of the present invention.

When a plurality of snow-melting roof tiles are fixed to the batten 400, if the heat generation part of each snow-melting roof tile is electrically connected in the first direction (X-axis direction) as illustrated in FIGS. 10A to 11, the internal cable of the heat generation part 200 has to pass between the first bending part 102 and/or the second bending part 103 and the batten 400.

Here, if the cable passing part 104 is provided in the metal roof tile 100, the cable may decrease degree of pressing or be not pressed at all. The cable passing part 104 may provided in at least one or more of the first bending part 102 or the second bending part 103. Also, the cable passing part 104 may be provided in the main cover part 101.

For example, the cable passing part 104 may include a first cable passing part 104a provided in the first bending part 102 and a second cable passing part 104b provided in the second bending part 103.

The first cable passing part 104a may have a shape in which a portion of the horizontal extension part 102b protrudes upwardly and thus is spaced apart from the top surface of the batten 400. Alternatively, the first cable passing part 104a may have a shape in which a portion of the vertical extension part 102a protrudes in a direction opposite to the batten 400 and thus is spaced apart from one side surface of the batten 400. The first cable passing part 104a may be provided in one of the vertical extension part 102a and the horizontal extension part 102b or in each of both the vertical extension part 102a and the horizontal extension part 102b. Also, if it is no matter that a cable of the connecting part 200 that will be described later is pressed, the cable passing part 104 may not be provided.

Also, when the cable passing part 104 is provided in the second bending part 103, i.e., in case of the second cable bending part 104b, the second cable bending part 104b may protrude in a direction that is away from the batten 400 and thus be disposed to be spaced apart from one side surface of the batten 400.

When the cable passing part 104 is provided in each of the first bending part 102 and the second bending part 103, the cable passing part 104 provided in the first bending part 102 may be disposed to be able to overlap the cable passing part 104 provided in the second bending part 103 when constructed. That is, the cable passing part 104 provided in the first bending part 102 of one snow-melting roof tile overlaps the cable passing part 104 provided in the second bending part 103 of anther snow-melting roof tile, thereby functioning to prevent a sliding between two snow-melting roof tiles overlapping each other.

Also, the second cable passing part 104b may have a shape in which a portion thereof is lifted upwardly so that the lower end of the second cable passing part 104b has a shape recessed upwardly. When a plurality of snow-melting roof tiles are installed, the first bending part 102 of one snow-melting roof tile overlaps the second bending part 103 of another snow-melting roof tile disposed adjacent thereto in the first direction, and the first cable passing part 104 of the adjacent snow-melting roof tile may be inserted into the recessed portion.

Also, the cable passing part 104 may be provided lengthily in the first direction (X-axis direction). Also, when the metal roof tile 101 itself has a curved shape, a portion of the curved shape may be utilized as a cable passing part.

When the cable passing part 104 is provided in all of the first bending part 102, the main cover part 101, and the second bending part 103, the cable passing parts respectively provided in the first bending part 102, the main cover part 101, and the second bending part 103 may be aligned on the same line, and on the other hand, the cable passing parts may be provided in offset relation to each other. Also, when the cable passing part is provided in the first bending part 102, the cable passing part provided in the vertical extension part 102a and the cable passing part provided in the horizontal extension part 102b may not be disposed on the same line but in offset relation or the cable passing part may be bent in a curved line.

Also, the cable passing part 104 may be provided in the overlapping part 109. When the cable passing part 104 is provided in the overlapping part 109, if two snow-melting roof tiles are disposed while portions thereof overlap each other in the second direction (longitudinal direction), a slip in the longitudinal direction may be prevented.

Also, the cable passing part 104 may have a relatively very large area. For example, when a portion of the main cover part 101 or the horizontal extension part 102 protrudes convexly downward, if a non-protruding portion is spaced apart from the batten 400 or the roof surface (in case of a batten-less type described later), an entire spaced portion may be the cable passing part 104.

Also, the metal roof tile 100 may include a metal part 110 and a stone chip coating layer 120 as illustrated in FIG. 4. In the above-description, the metal roof tile 100 includes the main cover part 101, the first bending part 102, the second bending part 103, the cable passing part 104, and the like on the basis of a bent shape of the metal roof tile, and the metal roof tile 100 includes the metal part 110 and the stone chip coating layer 120 on the basis of a structure of a cross-section.

The metal part 110 may be formed by molding a metal having excellent corrosion resistance into a roof tile shape. That is, the metal part may be formed by being molded into the roof tile shape including the main cover part, the first bending part, and the second bending part. Here, the metal having excellent corrosion resistance may be, for example, galvalume or zincalume in which a plating layer including aluminum (Al) and zinc (Zn) is bonded to a steel base. Since it is preferable that the metal roof tile 100 is not deformed even in a harsh climatic condition due to the exposure to the outside, it is better to use the metal having excellent corrosion resistance.

The stone chip coating layer 120 may be provided on the metal part 110. The stone chip coating layer 120 includes a plurality of natural stone chips attached on the metal part 110. The natural stone chips may be attached to the top surface of the metal part by an acrylic-based water soluble adhesive. The natural stone chip may be a volcanic stone having a diameter of approximately 0.5 mm to 2 mm.

The heat generation part 200 includes a heating body 210 and the connecting part 220 extending from the heating body.

The heating body 210 includes a heating material 211 and an insulating and waterproofing part 212 configured to surround the exterior of the heating material 211 for insulation and waterproof. The heating material 211 may be a planar-shaped heating material including carbon. The planar-shaped heating material includes carbon having a thin film shape and uses characteristics in which the carbon generates heat by electrical resistance. However, the heating material 211 is not limited to the planar-shaped heating material including the carbon. Thus, the heating material 211 may be a heating cable or other products.

Figure 5:
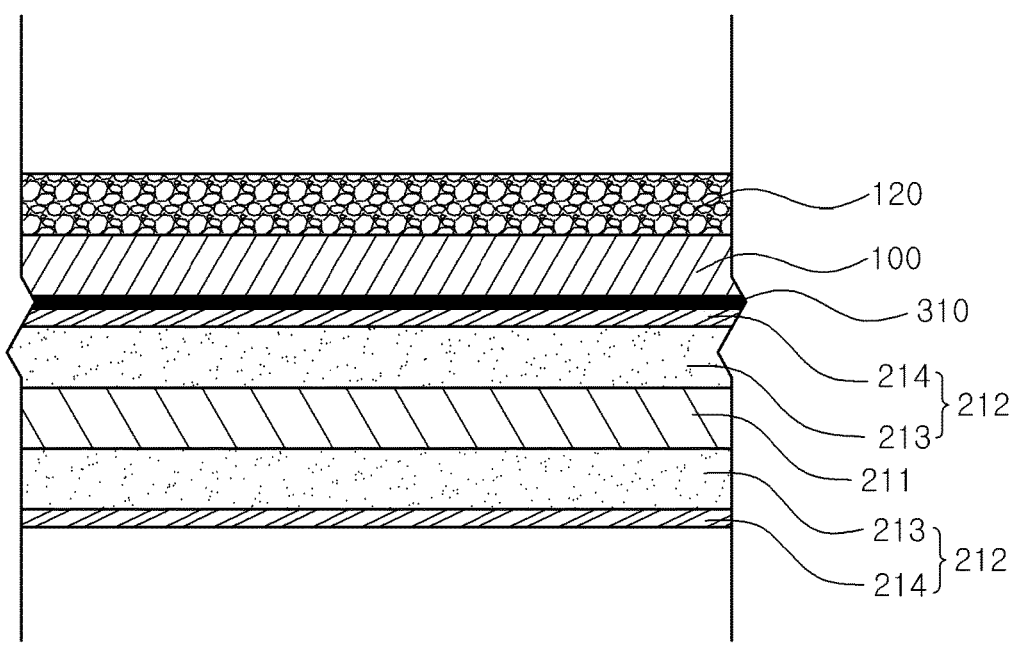
FIG. 5 is a cross-sectional view illustrating another example of an insulating and waterproofing part.

The insulating and waterproofing part 212 may be provided so that one layer disposed in each of upper and lower portions of the heating material 211 performs both insulating and waterproofing functions as illustrated in FIG. 4, or may be provided so that a plurality of layers are disposed on each of the upper and lower portions of the heating material 211 as illustrated in FIG. 5. For example, a first insulating and waterproofing part 212 and a second insulating and waterproofing part 213 may be provided. In this case, each of the first insulating and waterproofing part 212 or the second insulating and waterproofing part 213 may have one or more functions of insulating and waterproofing, or one of the first insulating and waterproofing part 212 and the second insulating and waterproofing part 213 may have an insulating and waterproofing functions and the other one thereof may have a protecting or assisting function.

The heating body 211 may be disposed at an upper portion or a lower portion of the main cover part 101 and may be preferably disposed at the lower portion of the main cover part 101, and also may be disposed without overlapping at least one of the overlapping parts 109 disposed in both ends in the second direction (longitudinal direction). If the heating body 211 is also disposed at the lower portion of the overlapping part, when one snow-melting roof tile and another snow-melting roof tile adjacent thereto are disposed to overlap each other, because a vertical gap between two snow-melting roof tiles is formed to cause leakage, the heating body 211 may not be allowed to be disposed at a portion in which two snow-melting roof tiles contact and overlap each other.

The connecting part 220 may include a female connector 221, a male connector 222, and the internal cable 223. The female connector 221 may have a polygonal column shape in which an empty space is provided therein, for example a cylindrical shape. The male connector 222 may have a shape corresponding to the shape of the female connector in order to be inserted into the male connector. Thus, when the female connector has a hollow cylindrical shape, the male connector may have a cylindrical shape.

The female connector 221 may be provided in a par of female connectors at one side of the heating body 210, and the male connector 222 may be provided in a pair of male connectors at a side opposite thereto. However, the embodiment is not limited thereto. For example, one female connector 221 and one male connector 222 may be provided in one side of the heating body 210, and one female connector 221 and one male connector 222 may be provided in the other side.

The internal cable 223 has one side connected to the heating body 221. Also, the internal cable 223 may have the other side configured to electrically connect the female connector 221 and the male connector 222 to the heating body 210. Here, the internal cable 223 is distinguished from a cable that is able to be separately provided to the outside of the snow-melting roof tile, and in order to avoid confusion, a cable, one end of which is directly connected to the heating body 221 of the snow-melting roof tile, is denoted as the internal cable 223, and the other cables except the internal cable are denoted as external cables 500 (refer to FIGS. 13 and 14). A cable which is not denoted as an internal or an external term may be understood to include both the internal cable and the outside cable.

However, the connecting part 220 may not necessarily include the female connector 221 and the male connector 222, and the other kinds of connectors that are capable of being connected without division of female and male portions. Also, the connecting part 220 includes only the internal cable 223 and may not include the female connector 221 or the male connector 222. For example, when the connecting part 220 is connected to a separate external cable (not shown), if a connector capable of being connected to the internal cable 223 is provided in the external cable, the female connector 221 or the male connector 222 may not be connected to the internal cable 223 during a manufacturing process of the snow-melting roof tile. And then, the internal cable 223 of the connecting part 200 may be connected to the connector provided in the external cable (not shown) during a construction.

Figure 12:
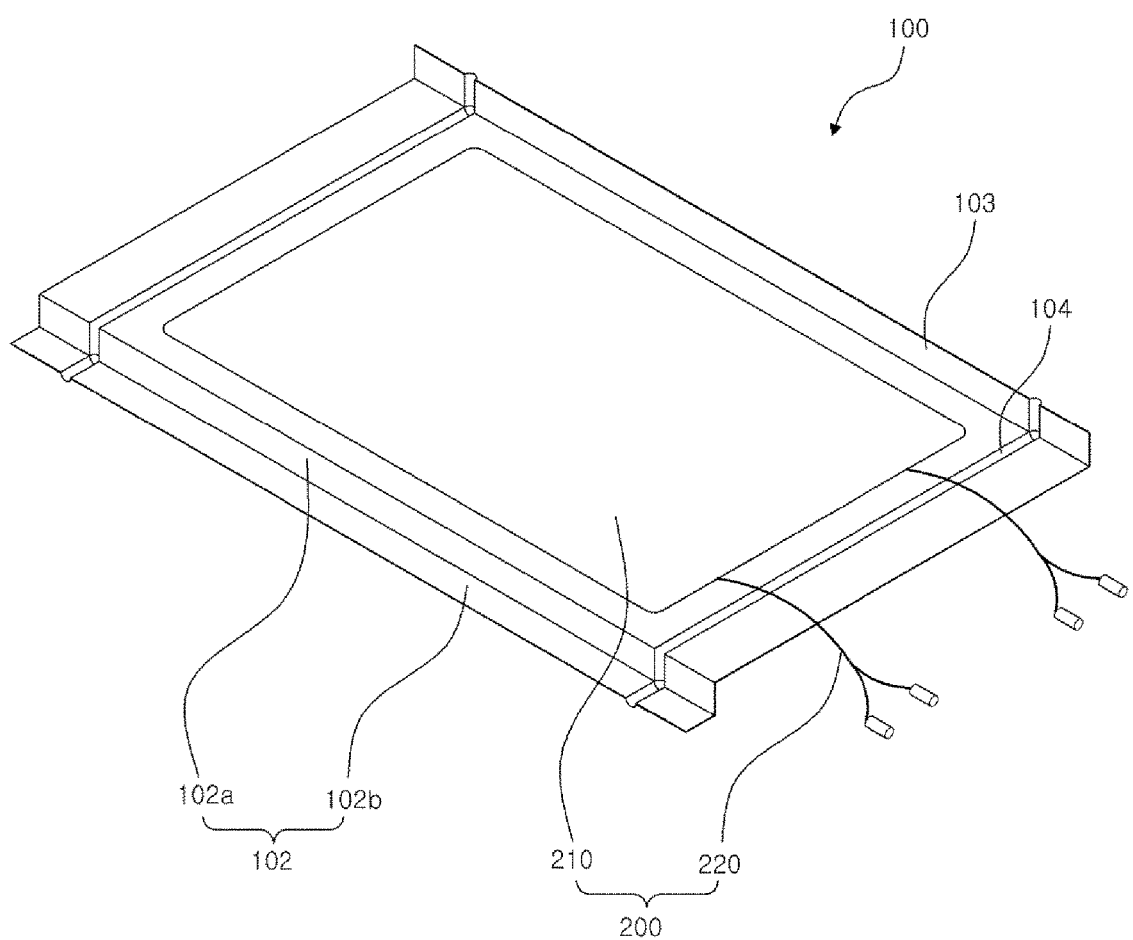
FIG. 12 is a perspective view illustrating a configuration of the snow-melting roof tile when obliquely viewed from the lower side according to an embodiment of the present invention.

Also, the connecting part 220 may be provided in each of both sides of the heating body 210. However, one or several connecting parts 220 may be provided in only one side as illustrated in FIG. 12.

The fixing part 300 allows the heat generation part 200 to be fixed to the metal roof tile 100, and the fixing part 300 may be a single unit or may include two or more units. That is, the fixing part may include a main fixing part and a sub fixing part.

As illustrated in FIG. 2, the main fixing part 310 may be a double sided tape attached to the bottom surface of the metal roof tile.

Figure 6:
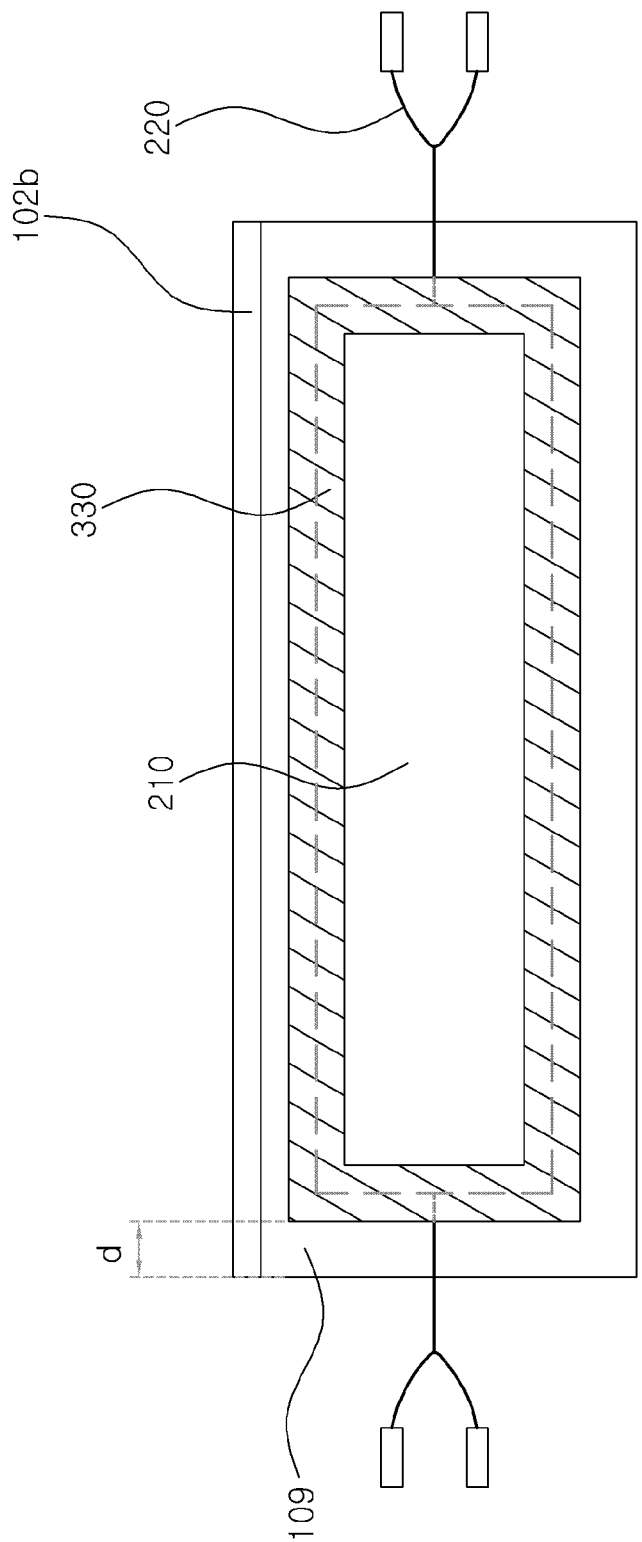
FIG. 6 is a bottom view of the snow-melting roof tile to which a fixing part having another shape is applied.

FIG. 6 illustrates a configuration to which a fixing part 330 having another shape is applied. FIG. 6 is a bottom view of the snow-melting roof tile. Here, the fixing part 330 may be an adhesive sheet or tape attached to the bottom surface of the heating body 210. Here, the top surface of the fixing part 330 has an adhesive force. Although an example in which the fixing part 330 is attached along ends of the heating body 210 is illustrated in FIG. 6, the embodiment is not limited thereto. For example, the fixing part 330 may have an area greater than that of the heating body 210 and may entirely cover the heating body 210. The fixing part 330 has a portion attached to the heating body 210 and another portion attached to the bottom surface of the metal roof tile 100. Thus, the heating body 210 is firmly fixed to the bottom surface of the metal roof tile 100. Also, the tape may be used with the double sided tape as illustrated in FIG. 4. Also, when the fixing part 330 has an area greater than that of the heating body 210 and entirely covers the heating body 210, the fixing part 330 includes an insulating part and may reduce the transfer of the heat of the heating body 210 downward and maximally transfer the heat upwardly.

Figure 7:
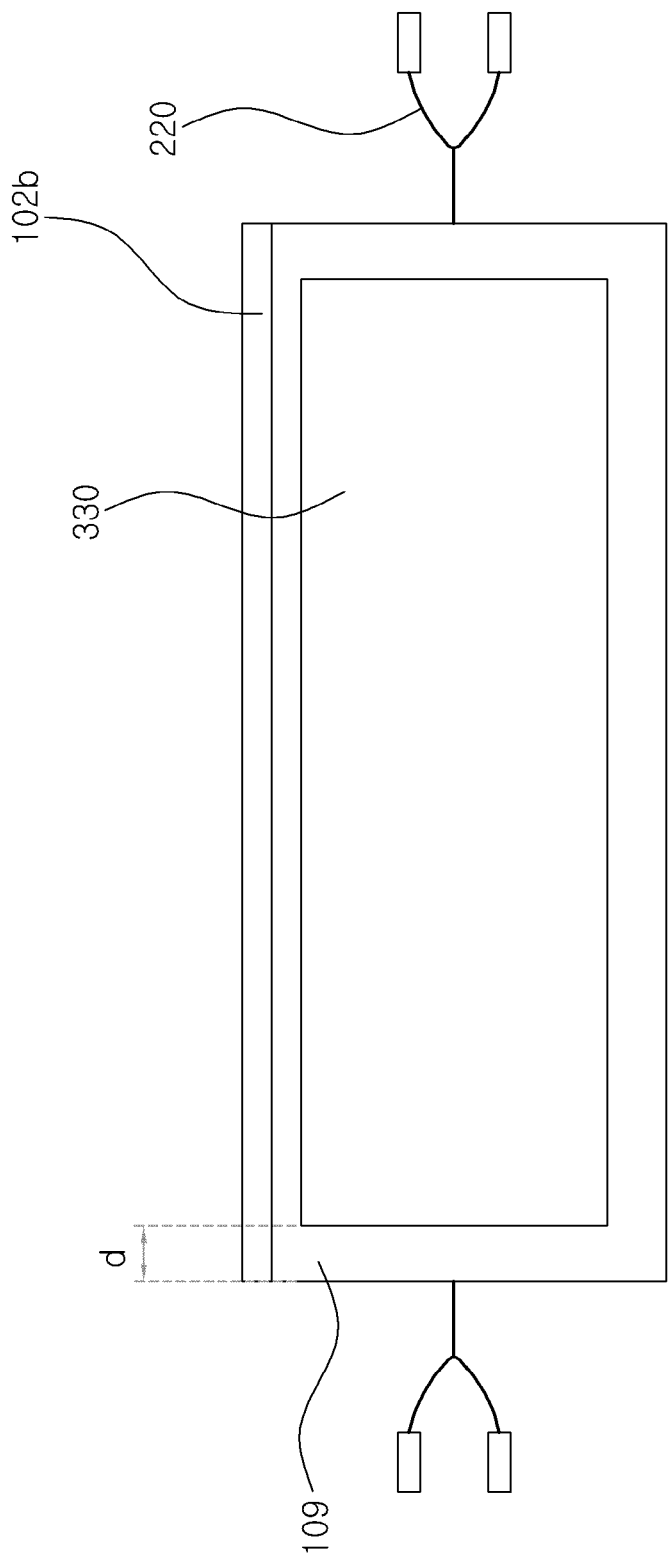
FIG. 7 is a bottom view illustrating the snow-melting roof tile to which a fixing part having further another shape is applied.
Figure 8:
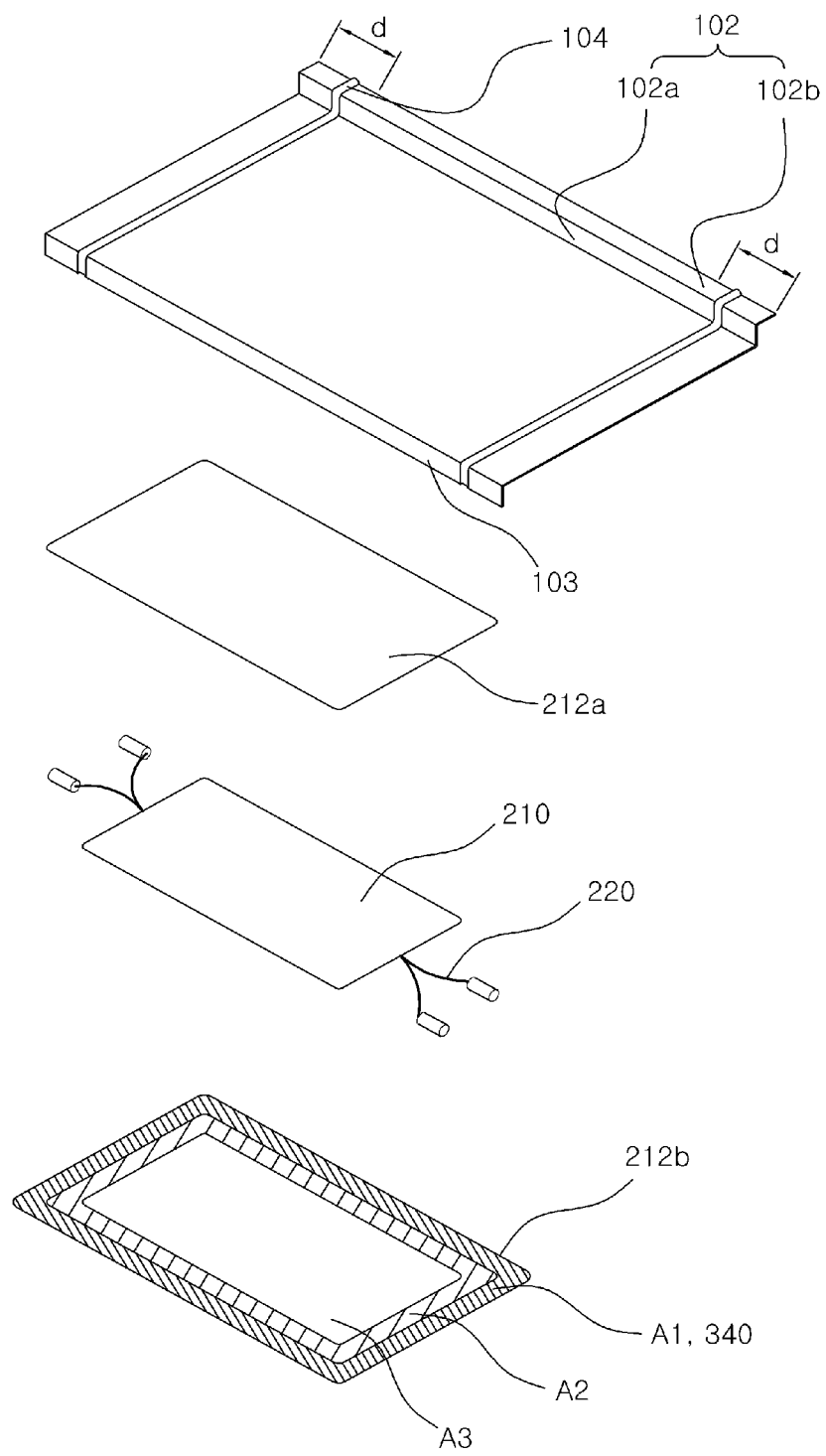
FIG. 8 is an exploded perspective view illustrating a snow-melting roof tile of FIG. 7, FIGS. 9A and 9B are views illustrating a configuration in which the snow-melting roof tiles are installed in series in a longitudinal direction according to an embodiment of the present invention.

FIGS. 7 and 8 illustrate a configuration to which a fixing part 330 having further another shape is applied. FIG. 7 illustrates a shape of one example of a snow-melting roof tile when viewed from the lower side, and is an exploded perspective view of the snow-melting roof tile of FIG. 7. Here, the fixing part 330 may be a portion of an insulating and waterproofing part. For example, the fixing part 300 is provided in each of both upper and lower sides of the heating material 211 and may be a sheet shape having an adhesive force on one surface thereof. Explaining in more detail, an insulating and waterproofing part 212 includes an upper sheet 212a, which is disposed at an upper portion of the heating material 211 and has an adhesive force on a lower portion thereof, and a lower sheet 212b, which is disposed at a lower portion of the heating material 211 and has an adhesive force on an upper portion thereof.

Referring to FIG. 8, in the lower sheet 212b, an area corresponding to the heating material 211 is A3, an area corresponding to the upper sheet 212a is the area (A3+A2), and an area not overlapped with the upper sheet 212a is A1.

Explaining again, the area (A3+A2) of the upper sheet 212a is provided to be greater by A2 than the area A3 of the heating material 211. Thus, the upper sheet 212a has a border disposed more outward than that of the heating material 211. Also, the area (A3+A2+A1) of the lower sheet 212b is provided to be greater by A1 than the area (A3+A2) of the upper sheet 212a. Thus, the lower sheet 212b has a border greater than the area of the upper sheet 212a. Also, the outer area A1, which does not overlap the upper sheet 212a in the lower sheet 212b, is attached to the bottom surface of the metal roof tile 100, with an adhesive force. Also, a fixing part 340 includes this portion A1.

Hereinafter, referring to FIGS. 9A to 14, a roof snow-melting system and a method for installing a snow-melting roof tile according to embodiments of the present invention will be described.

Figure 9A:
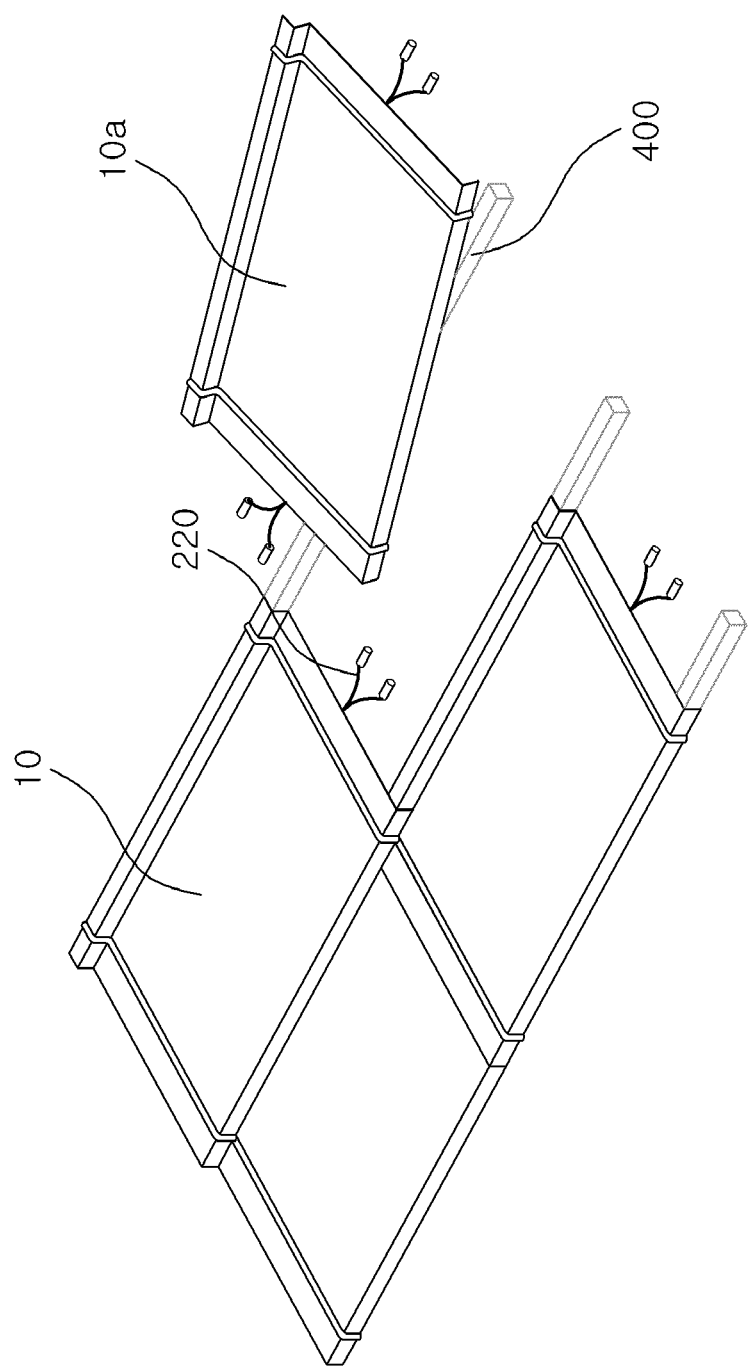
Figure 9B:
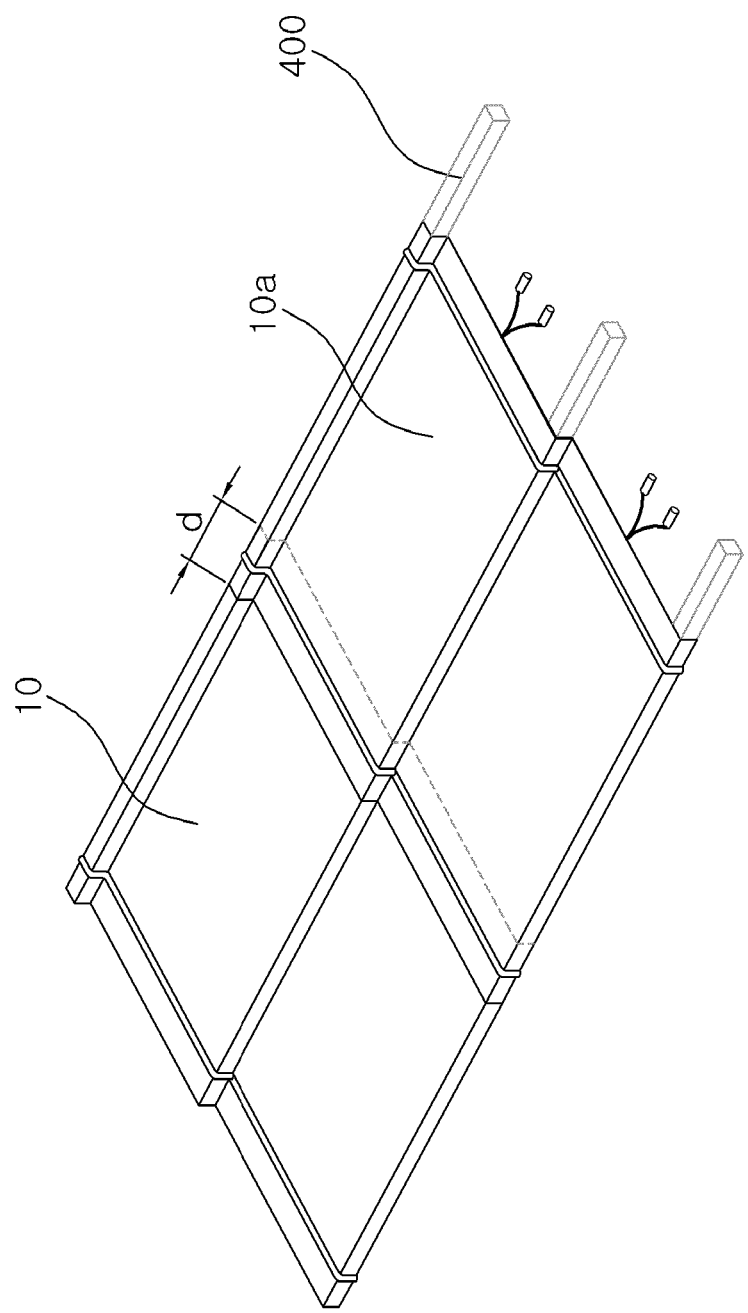

FIGS. 9A and 9B illustrate a configuration, in which a plurality of snow-melting roof tiles are connected to the batten 400 in series in the longitudinal direction (Y-axis).

First, a plurality of battens 400 are installed on a roof. The batten 400 may be made of wood or a metallic material and may extend in the longitudinal direction. The plurality of battens 400 extend in parallel with each other.

When snow-melting roof tiles 10 and 10a are installed, the second bending part 103 is disposed on the batten 400 positioned at a lower side of an inclined surface of the roof, and the first bending part 102 is disposed on the batten 400 positioned at an upper side of the inclined surface of the roof. The snow-melting roof tile may be fixed to the batten 400 by a nail, or a screw, or the like.

One of the plurality of snow-melting roof tiles is called the first snow-melting roof tile 10, and another one of the snow-melting roof tiles is called the second snow-melting roof tile 10a.

First, the first snow-melting roof tile 10 is installed on the batten 400, and then the second snow-melting roof tile 10a adjacent to the first snow-melting roof tile 10 in the longitudinal direction is disposed. Here, the first snow-melting roof tile 10 is disposed to overlap the second snow-melting roof tile 10a by a predetermined distance (d) in the longitudinal direction. As described above, since the heating material 210 of the heat generation part 200 is not disposed on the overlapped portion, the heating body 210 is not insertedly disposed between the first snow-melting roof tile 10 and the second snow-melting roof tile 10a. Also, prior to the fixing of the second snow-melting roof tile 10a to the batten 400, the connecting part 200 of the first snow-melting roof tile 10 is connected to the connecting part 200 of the second snow-melting roof tile 10a. Here, if each of the connecting parts 200 includes the female connector 221 and the male connector 222, the female connector 221 of the first snow-melting roof tile 10 may be connected to the male connector 222 of the second snow-melting roof tile 10a, and the male connector 222 of the first snow-melting roof tile 10 may be connected to the female connector 221 of the second snow-melting roof tile 10b.

Thus, the first snow-melting roof tile 10 is electrically connected in series to the second snow-melting roof tile 10a adjacent thereto. More snow-melting roof tiles are installed by the same manner.

When power is connected after the plurality of snow-melting roof tiles are installed, the heat generation part 200 generates heat, and the heat is transferred to the metal roof tile 100. Since the metal roof tile 100 not only contacts the heating part 200, but also has excellent heat transfer characteristics that a metallic material has, the metal roof tile is uniformly heated over the entire surface thereof.

Since it is enough if the metal roof tile 100 has a heating temperature to melt the snow, the heating temperature is in the range of about 5° C. to about 20° C. although the heating temperature may be changed depending on the climatic condition. The heating temperature may be raised in a very cold region.

FIGS. 10A and 10B illustrates an example in which the heat generation part 200 is connected in series in a width direction (X-axis direction) of the snow-melting roof tile.

Basically, a method for fixing the snow-melting roof tile to the batten 400 is the same as the example referred previously in FIGS. 9A and 9B.

However, while a heat generation part of one snow-melting roof tile is connected in series to a heat generation part of a snow-melting roof tile adjacent thereto in the second direction (longitudinal direction) in FIGS. 9A and 9B, the example referred in FIGS. 10A and 10B is different from the above-described example in that a heat generation part of one snow-melting roof tile is connected in series to a heat generation part of a snow-melting roof tile adjacent thereto in the first direction (width direction).

Thus, a pair of connecting parts 220 of the heat generation part 200 may protrude from one side of the heating body 210 in the longitudinal direction. That is, two connecting parts 220, i.e., four connectors may protrude in the longitudinal direction of the heating body 210.

For example, one of the plurality of snow-melting roof tiles is denoted as a first snow-melting roof tile 10, and another snow-melting roof tile disposed adjacent to the first snow-melting tile 10 in the width direction is denoted as a second snow-melting roof tile 10a.

First, the first snow-melting roof tile 10 is fixed to the batten 400. Then, one of two connectors of the first snow-melting roof tile 10 is exposed to the outside by passing the batten 400 through the cable passing part 104 provided in the first snow-melting roof tile 10.

Also, the exposed connector 220 of the first snow-melting roof tile 10 is coupled to one of two connectors 220 of the second snow-melting roof tile 10a. Then, the second snow-melting roof tile 10a is fixed to the batten. Here, one of two connectors of the second snow-melting roof tile 10a is covered by the second snow-melting roof tile 10a and thus is disposed under the second snow-melting roof tile 10, and the other of two connecting parts is exposed by passing through the cable passing part 104 of the second snow-melting roof tile 10a.

Also, one of two connecting parts 220 may protrude from one side of the heating body 210 in the width direction, and the other may protrude in a direction opposite thereto. In this case, an installation state is also the same as that illustrated in FIGS. 10A and 10B.

Also, when the heat generation part 200 of the snow-melting roof tile is connected in the width direction, a method illustrated in FIG. 11 may be available. This method is not performed in a manner in which the connecting parts 220 of one snow-melting roof tile 10 is moved above or under the inclined surface of the roof through the cable passing part 104 of the corresponding snow-melting roof tile, but performed in a manner in which the connecting parts 220 of one snow-melting roof tile 10 is pulled to the outside in the longitudinal direction of the snow-melting roof tile and then is connected to the connecting part 220 of the snow-melting roof tile 10*a* adjacent thereto in the width direction. Then, when another snow-melting roof tile adjacently disposed in the longitudinal direction is disposed, the internal cable 223 of the connecting part 220 may be disposed under the cable passing part 104 of the snow-melting roof tile adjacently disposed in the longitudinal direction. When performed by the above described method, a connecting operation between the connecting part of one snow-melting roof tile and the connecting part of the snow-melting roof tile adjacent thereto in the width direction may be easily performed.

Also, when the plurality of snow-melting roof tiles are installed, one heat generation part may be connected in parallel to another heat generation part by using the external cable 500 as illustrated in FIGS. 13 and 14.

FIG. 13 is a view illustrating the external cable 500 extending in the longitudinal direction, and FIG. 14 is a view illustrating a case in which the external cable 500 is connected in the width direction.

The external cable include a parallel connecting connector 510, and two connectors 220 provided in one heat generation part 200 may be connected to one parallel connecting connector 510.

Referring to FIG. 13, the first snow-melting roof tile 10 is adjacently disposed to overlap the second snow-melting roof tile 10*a* by a predetermined distance d in the longitudinal direction. Here, a connector of the first snow-melting roof tile 10 is exposed to the outside of the first snow-melting roof tile 10 in the longitudinal direction and may be connected to one parallel connecting connector 510.

After the first snow-melting roof tile 10 is installed, the second snow-melting roof tile 10*a* is installed. When the second snow-melting roof tile 10*a* is installed, the cable passing part 104 may be disposed at a position corresponding to the connecting part 220 of the first snow-melting roof tile 10. Then, the connector 220 of the second snow-melting roof tile 10 is connected to another parallel connecting connector 510.

Hereinafter, referring to FIG. 14, an installation example, in which the parallel connecting connector 510 extends in the width direction, will be described. The first snow-melting roof tile 10 and the second snow-melting roof tile 10*a* are disposed in the width direction. Here, the connector of each snow-melting roof tile is exposed to in the width direction. The exposed connector 220 is connected to the parallel connecting connector 510 of the external cable 500. Then, other snow-melting roof tiles cover the external cable and are fixed. Here, the external cable 500 may be disposed to pass through the cable passing part 104.

Figure 16:
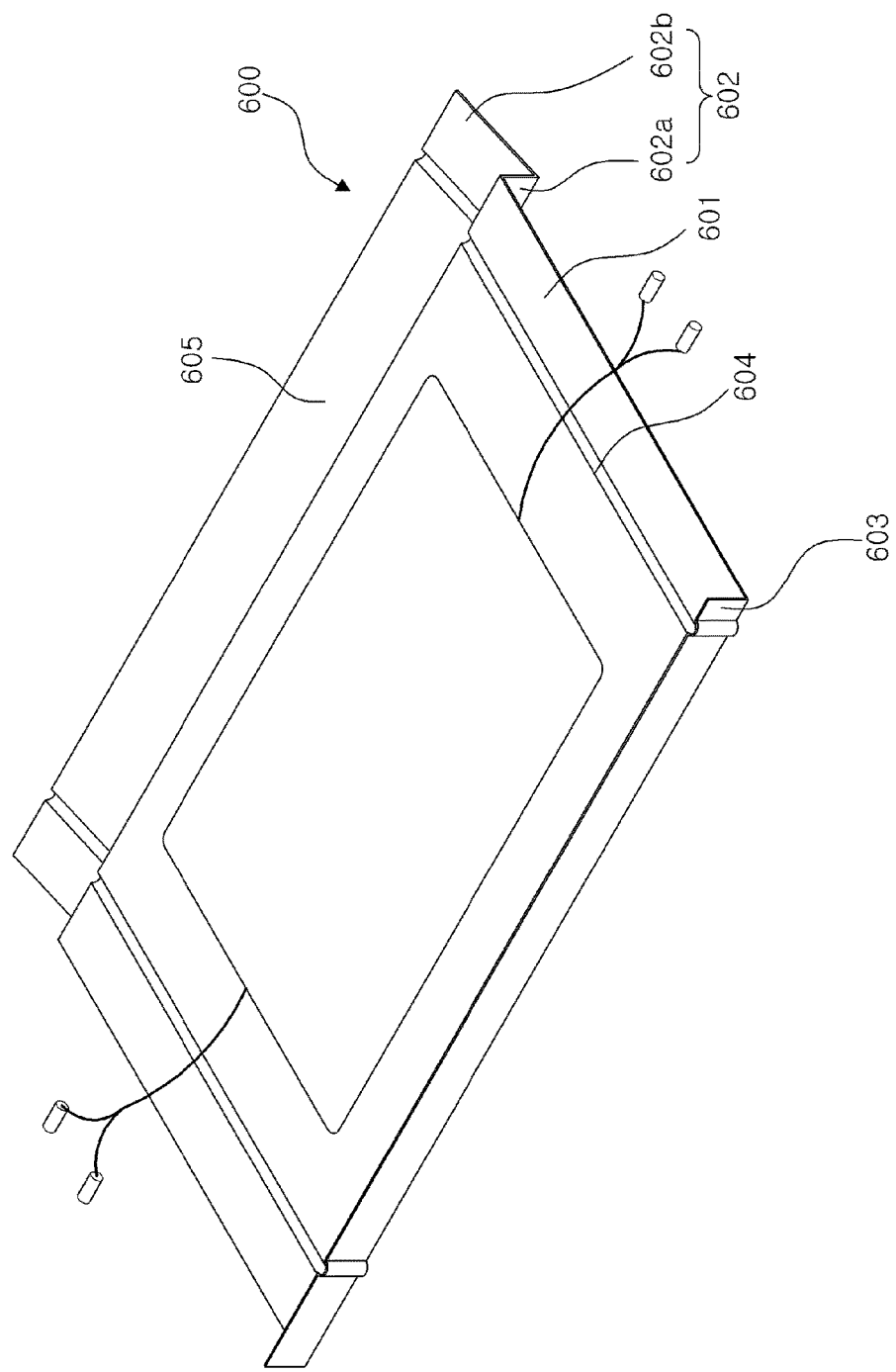
FIG. 16 is a perspective view of the batten-less type snow-melting roof tile when viewed from the lower side according to an embodiment of the present invention.

FIG. 15 is a view illustrating construction of a batten-less type snow-melting roof tile installed to the roof surface without using the batten, FIG. 16 is a perspective view of the batten-less type snow-melting roof tile when viewed from the lower side.

In the batten-less type snow-melting roof tile, the heat generation part 200 is attached under a batten-less type metal roof tile 600. Here, the batten-less type metal roof tile 600 includes a main cover part 601, a first bending part 602 disposed adjacent to a first end portion 605, and a second bending part 603 disposed adjacent to a second end portion 606. Also, the first bending part 602 includes a vertical extension part 602*a* and a horizontal extension part 602*b*. Also, the batten-less type snow-melting roof tile may include a cable passing part 604. When compared to the metal roof tile previously described by referring to FIGS. 1 to 12, although the batten-less type metal roof tile is different from the metal roof tile in that the horizontal extension part 602*a* of the first bending part 602 extends more lengthily in the width direction, since the batten-less type snow-melting roof tile has the same constitutions as the metal roof tile described by referring to FIGS. 1 to 12 except for the above-described difference, the repeated descriptions will be omitted.

Also, the constitution of the heat generation part 200 is the same as the example described by referring to FIGS. 1 to 12.

The cable passing part 604 may be provided in at least one of the first bending part 602, the second bending part 603, and the main cover part 601. Particularly, in the batten-less type, since an edge portion at which the first bending part 602 meets the main cover part 601 directly contacts the roof surface, a portion of the edge is formed to be recessed upwardly, and thus this portion may be the cable passing part 604.

Also, when the cable passing part 604 is a groove provided to be recessed upwardly at a place in which the first bending part 602 meets the main cover part 601, a lower end of the second bending part 602 may have a shape in which a portion thereof is recessed upwardly so as to correspond to the groove. However, the embodiment is not limited thereto. For example, the lower end of the second bending part may have a straight shape.

In addition, a portion of the first end part 605 is removed in a direction back to the second end part 606, and thus it may form the cable passing part 604.

Also, a detail method for installing the batten-less type snow-melting roof tile is the same as the foregoing case in which the snow-melting roof tile is installed to the batten, except that the snow melting roof tile is directly fixed to the roof surface without being fixed to the batten.

Figure 17:
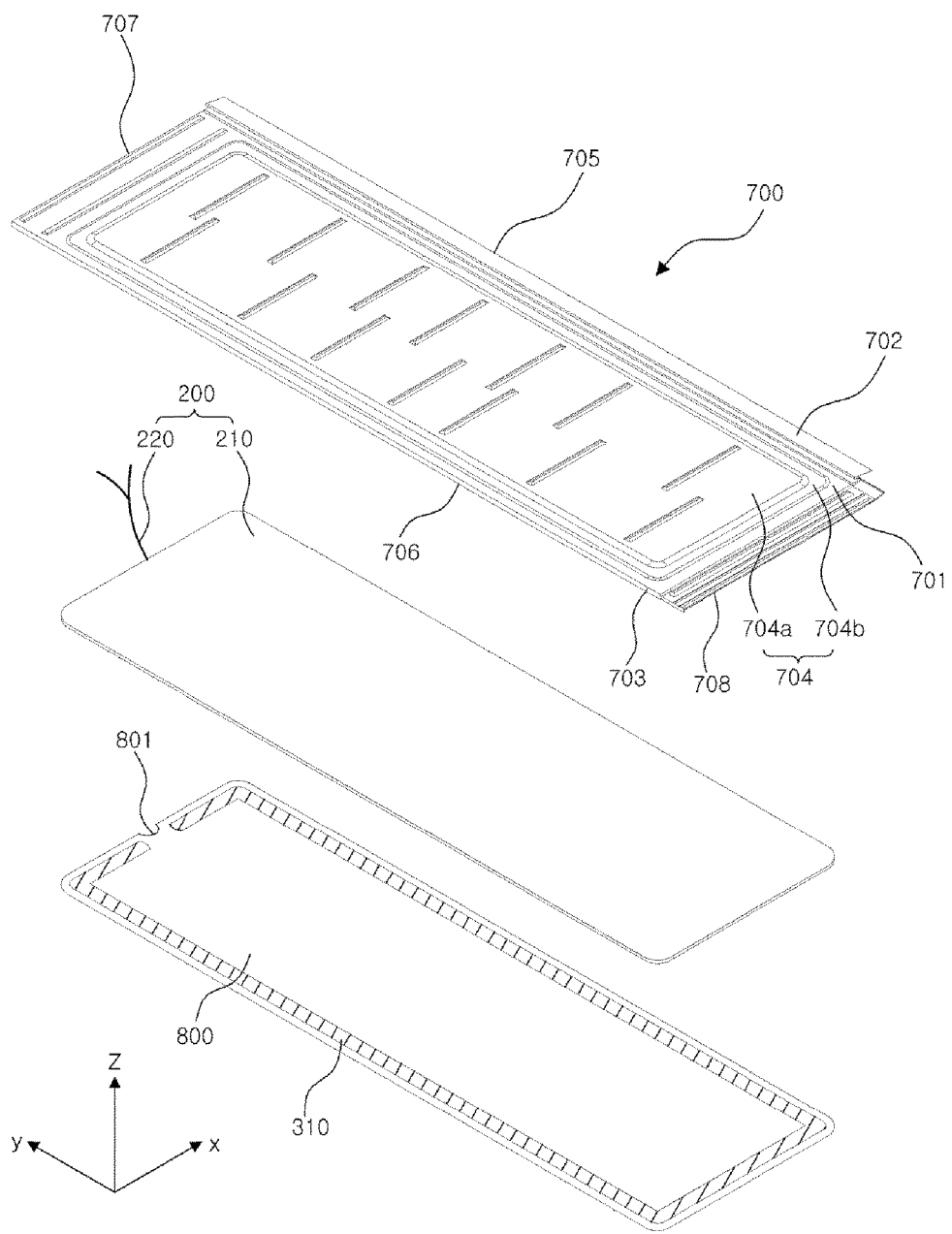
FIG. 17 is an exploded perspective of a snow-melting roof tile according to another embodiment of the present invention.
Figure 18:
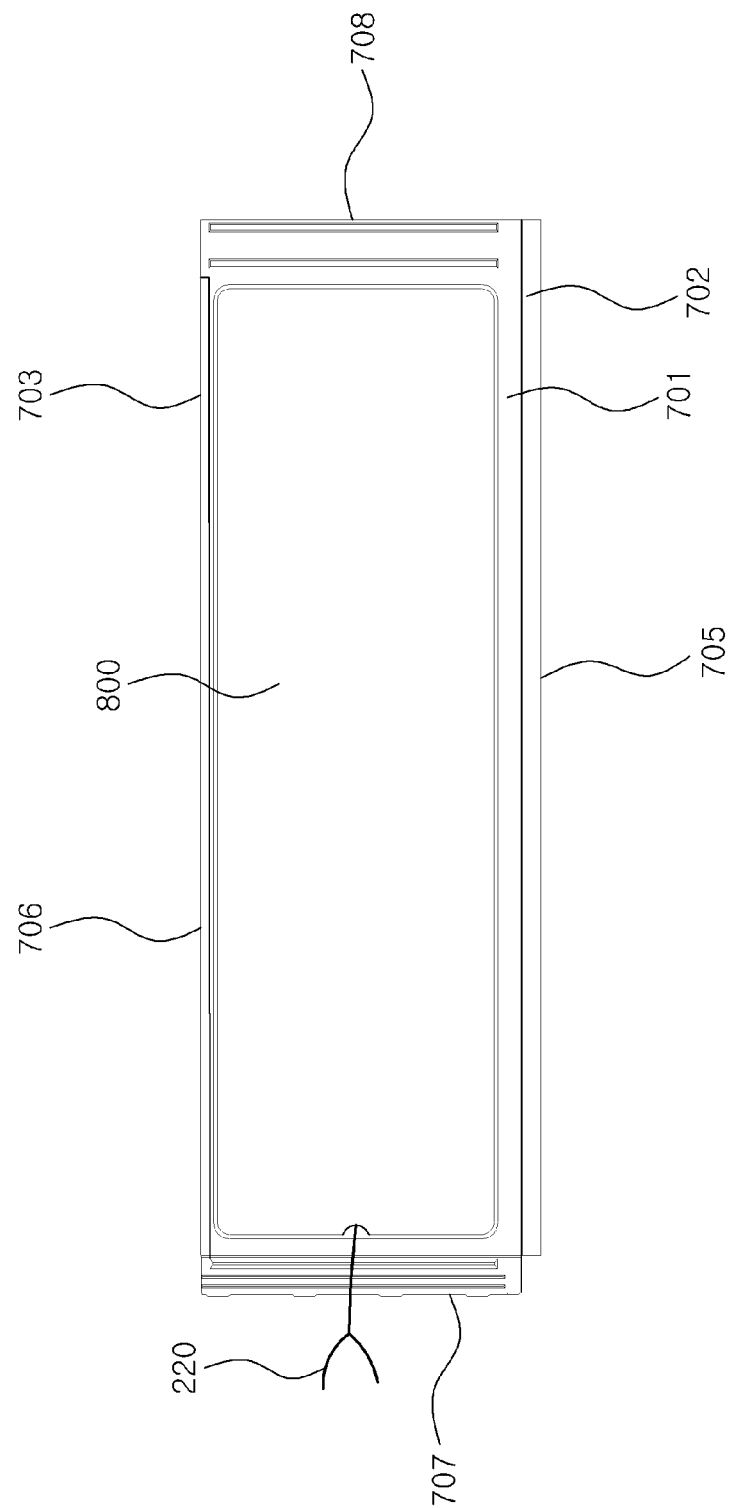
FIG. 18 is a bottom view of the snow-melting roof tile according to another embodiment of the present invention.
Figure 19:
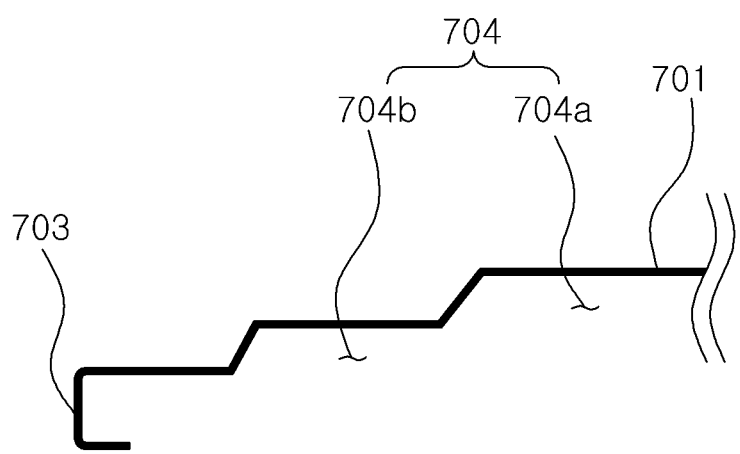
FIG. 19 is a side cross-sectional view illustrating a portion of a metal roof tile according to another embodiment of the present invention.
Figure 20:
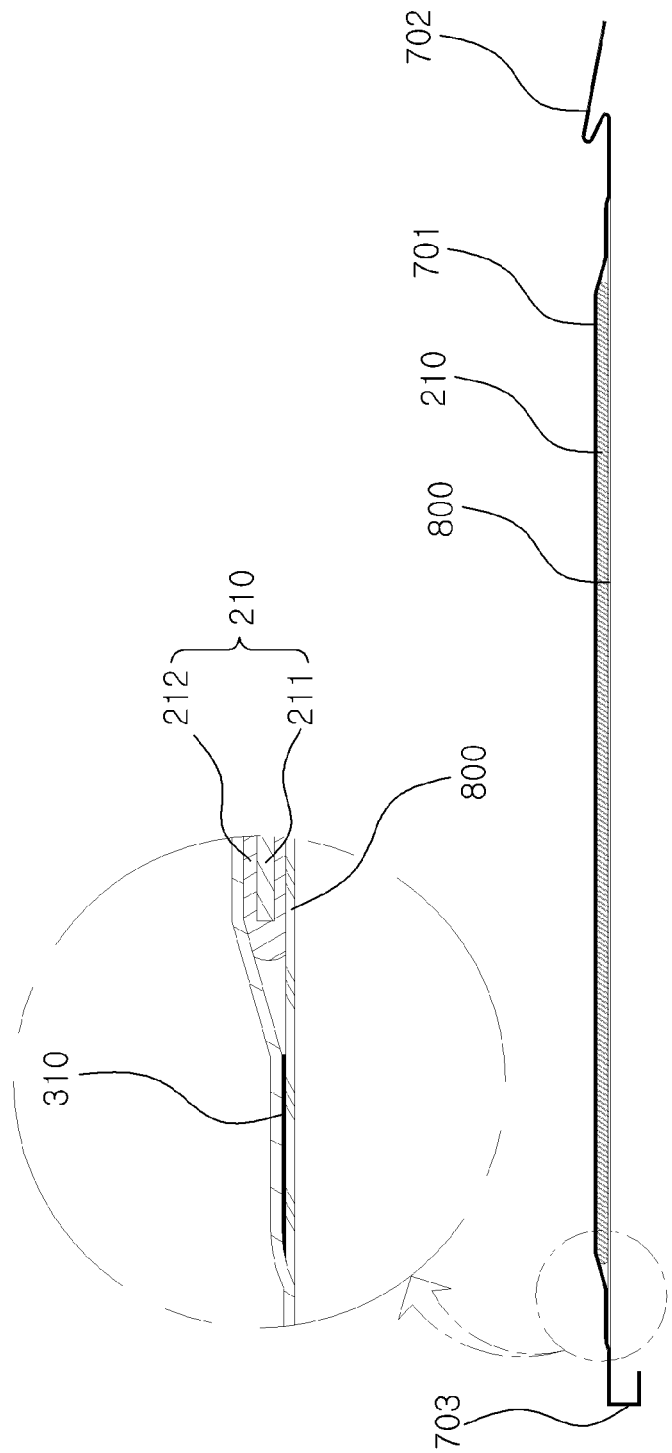
FIG. 20 is a side cross-sectional view of the snow-melting roof tile according to another embodiment of the present invention.

FIG. 17 is a view of a snow-melting roof tile according to another embodiment of the present invention, FIG. 18 is a bottom view of the snow-melting roof tile according to another embodiment of the present invention, FIG. 19 is a side cross-sectional view illustrating a portion of a metal roof tile according to another embodiment of the present invention, and FIG. 20 is a side cross-sectional view illustrating a snow-melting roof tile according to another embodiment of the present invention.

The snow-melting roof tile according to an embodiment of the present invention includes a metal roof tile 700, a heat generation part 200, and a fixing part 310.

The metal roof tile 700 may be formed by molding a metal into a tile shape. The metal roof tile 700 extends lengthily in a first direction (X-axis direction) and in a second direction (Y-axis direction). The first direction and the second direction cross each other. For example, the first and second directions may be perpendicular to each other. The first direction may be a width direction, and the second direction may be a longitudinal direction. Here, the longitudinal direction means a direction (Y-axis direction) in which the metal roof tile 700 extends relatively lengthily, and the width direction (X-axis direction) means a direction, perpendicular to the longitudinal direction, in which the metal roof tile extends relatively shortly.

The metal roof tile 700 includes a first end portion 705 and a second end portion 706, which are disposed at the both ends in the first direction (X-axis direction). Also, a third end portion 707 and a fourth end portion 708 disposed at the both ends in the second direction are included.

Also, the metal roof tile 700 further includes a first bending part 702 bent from the first end portion 705 in a vertical direction, a second bending part 703 bent from the second bending part 706 in a vertical direction, and a main cover part 701 disposed between the first bending part 702 and the second bending part 703.

Explaining the above description in more detail, the metal roof tile 700 includes the main cover part 701 having a relatively wide area, the first bending part 702 bent to protrude upwardly from one side of the main cover part 701, and the second bending part 703 bent to protrude downward from the other side of the main cover part 701. Thus, the first bending part 702 is disposed opposite to the second bending part 703 in the first direction (X-axis direction, width direction) with respect to the main cover part 701. Also, each of the first bending part 702 and the second bending part 703 extends lengthily in the second direction (Y-axis direction, longitudinal direction). The embodiment is not limited to shapes of the first bending part 702 and the second bending part 703. Each of the first bending part 702 and the second bending part 703 may have the same shape as illustrated in FIG. 1 and may have the same shape as illustrated in FIG. 20.

Also, the metal roof tile 100 includes an overlapping area provided at each of both ends in the second direction (longitudinal direction and Y-axis). The overlapping area is disposed at an area extending from each of the third end portion 707 and the fourth end portion 708 by a predetermined distance. The overlapping area is a region in which one metal roof tile 100 is disposed to overlap a metal roof tile 700 adjacent thereto in the longitudinal direction.

The metal roof tile 700 may include a stone chip coating layer on which natural stone chips are applied. This is the same as the metal roof tile 100 in the embodiment described previously.

The metal roof tile 700 further includes an accommodation part 704 configured to accommodate the heat generation part 200. A portion of the metal roof tile 700 is recessed upwardly and downward to provide the accommodation part 104. For example, the main cover part 701 may have a central portion recessed upwardly or downward. Although the current embodiment describes an example in which the accommodation part 704 has a shape recessed from a lower portion to an upper portion, the embodiment is not limited thereto.

The accommodation part 704 is formed to be stepped in two stages. Thus, the accommodation part 704 includes a main accommodation part 704a recessed more deeply and a stepped portion 704b recessed to a height lower than the main accommodation part 704a. The stepped portion 704b is provided outside along an edge of the main accommodation part 704a. The stepped portions 704b may be provided adjacent to all of the first end portion 705, the second end portion 706, the third end portion 707, and the fourth end portion 708 to the outside of the main accommodation part 704 or may be provided adjacent to some portions thereof.

Since the heat generation part 200 is the same as the foregoing description, the same reference numeral is used, and the repeated description will be omitted.

The snow-melting roof tile according the current embodiment further includes a cover part 800. The cover part 800 is provided to be capable of opening and closing an opening part of the accommodation part 704. Thus, the cover part 800 may have a shape corresponding to the accommodation part 704. The cover part 800 performs to protect the heat generation part 200 accommodated in the accommodation part from the outside and to prevent inconvenience in construction of the roof due to exposure or protrusion of the heat generation part 200.

The cover part 800 may include a cable passing part 801. A portion of the cover part 800 may be cut to provide the cable passing part 801 so that a cable passes.

The fixing part 310 performs to couple the metal roof tile 700 to the cover part 800. The fixing part 310 may include, for example, a double sided tape. However, the embodiment is not limited thereto, and other adhesive materials may be used.

The fixing part 310 may extend along the stepped portion 704b. Thus, at least portion of an edge of the cover part 800 corresponding to the stepped part 704b may be attached to at least portion of the stepped portion 704b.

The bottom surface of the cover part 800 may provide the same surface as at least portion of the outside of the accommodation part 704 of the main cover part 701. Thus, the bottom surface thereof may be smooth.

The snow-melting roof tile as described above may be installed to be connected in series in the longitudinal direction, in parallel in the longitudinal direction, in series in the width direction, and in parallel in the width direction, in the same manner as the foregoing embodiment.

Also, the principle, in which the main cover part 701 of the metal roof tile 700 is recessed upwardly or downwardly to provide the accommodation part, may be applied to other metal roof tiles having different shapes. That is, the principle may be applied to both batten type and batten-less type metal roof tiles.

The constitution and the method of the foregoing embodiments are not limitedly applied to the snow-melting roof tile and the roof snow-melting system as described above, but all or part of the embodiments may be selectively combined so as to derive many variations.

What is claimed is:
1. A snow-meting roof tile, comprising:
a metal roof tile including
a main cover part,
a first end portion and a second end portion, which are disposed at both ends in a first direction of the main cover part,
a first bending part bent upwardly from the first end portion, and
a second bending part bent downward from the second end portion;
a heat generation part located on a lower portion of the metal roof tile and including
a heating body for generating heat, and
a connecting part for connecting one heat generation part to another heat generation part or a cable,
wherein the heating body comprises,
a heating material generating the heat by applying a power to the heating material, and
an insulating and waterproofing part configured to surround an exterior of the heating material for insulation and waterproof; and
a fixing part for fixing the heat generation part to the metal roof tile,
wherein the heat generation part generates heat to heat the metal roof tile, thereby the heat of the heat generation part is transferred to an upper portion of the metal roof tile so as to melt snow on the metal roof tile,
the insulating and waterproofing part comprises an upper side insulating and waterproofing part of which an upper surface has an adhesive force, and a lower side insulating and waterproofing part of which a lower surface has an adhesive force, the upper side insulating and waterproofing part has an area greater than one of the heating material and cover entirely the heating material, the lower side insulating and waterproofing part has an area greater than one of the upper side insulating waterproofing part and cover entirely the upper side insulting and waterproofing part, and the fixing part includes a portion, which extends to the outside without overlapping the lower side insulating and waterproofing part and the upper side insulating and waterproofing part.

2. The snow-meting roof tile of claim 1, wherein the metal roof tile comprises a pair of overlapping parts, which are disposed at each of both ends in a second direction crossing the first direction, and overlap another metal roof tile adjacent to the metal roof tile, and wherein the heating body does not overlap at least one of the pair of overlapping parts.

3. The snow-meting roof tile of claim 1, further comprising a cable passing part provided in at least one of the first bending part and the second bending part and protruding towards the outside.

4. The snow-meting roof tile of claim 3, wherein the first bending part is disposed towards an upper side of an inclined surface of a roof and the second bending part is disposed towards a lower side of an inclined surface of the roof, and wherein the cable passing part comprises a first cable passing part protruding upwardly in the first bending part.

5. The snow-meting roof tile of claim 4, wherein the first cable passing part includes a portion protruding towards the second bending part.

6. The snow-meting roof tile of claim 4, wherein the cable passing part further comprises a second cable passing part protruding towards the outside.

7. The snow-meting roof tile of claim 6, wherein a lower end of the second cable passing part is formed to be recessed upwardly.

8. The snow-meting roof tile of claim 1, wherein the fixing part is disposed under the heating body and includes a portion attached to a bottom surface of the heating body and a portion attached to a bottom surface of the metal roof tile.

9. The snow-meting roof tile of claim 1, wherein the metal roof tile further comprises a stone chips attached to an upper surface of a metal part.

* * * * *